(12) United States Patent  
Wang

(10) Patent No.: US 12,537,934 B2  
(45) Date of Patent: Jan. 27, 2026

(54) VIDEO ENCODING METHOD AND APPARATUS, VIDEO DECODING METHOD AND APPARATUS, COMPUTER PROGRAM PRODUCT, COMPUTER-READABLE STORAGE MEDIUM, AND ELECTRONIC DEVICE

(71) Applicant: Tencent Technology (Shenzhen) Company Limited, Shenzhen (CN)

(72) Inventor: Yingbin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 532 days.

(21) Appl. No.: 17/981,323

(22) Filed: Nov. 4, 2022

(65) Prior Publication Data

US 2023/0056211 A1 Feb. 23, 2023

Related U.S. Application Data

(63) Continuation of application No. PCT/CN2021/136122, filed on Dec. 7, 2021.

(30) Foreign Application Priority Data

Feb. 5, 2021 (CN) .......................... 202110164797.9

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/46* (2014.11)

(58) Field of Classification Search
CPC ...... H04N 19/105; H04N 19/70; H04N 19/11; H04N 19/46; H04N 19/186; H04N 19/157; H04N 19/44; H04N 19/61; H04N 19/136

See application file for complete search history.

(56) References Cited

U.S. PATENT DOCUMENTS

2017/0347102 A1 11/2017 Panusopone et al.
2017/0347103 A1* 11/2017 Yu ........................ G01B 11/002

FOREIGN PATENT DOCUMENTS

CN 109845252 A 6/2019
CN 109845263 A 6/2019
(Continued)

OTHER PUBLICATIONS

Tencent Technology, WO, PCT/CN2021/136122, Mar. 7, 2022, 5 pgs.

(Continued)

*Primary Examiner* — Farhan Mahmud
(74) *Attorney, Agent, or Firm* — Morgan, Lewis & Bockius LLP

(57) ABSTRACT

The present disclosure provides a video decoding method performed by an electronic device. The method includes: decoding a bitstream to obtain a first flag, a first index value, and a second index value; determining a target intra prediction mode in a first intra prediction mode list according to the first index value and a target weighting list in a weighting list set according to the second index value when the first flag satisfying a first preset condition; determining reference samples of a first category and reference samples of a second category according to reference samples corresponding to the current block, and weighting the reference samples of the first category and the reference samples of the second category based on the target weighting list to obtain weighted reference samples; and predicting samples the in (Continued)

the current block according to the weighted reference samples and the target intra prediction mode.

20 Claims, 20 Drawing Sheets

(51) Int. Cl.
*H04N 19/159* (2014.01)
*H04N 19/176* (2014.01)
*H04N 19/46* (2014.01)

(56) References Cited

FOREIGN PATENT DOCUMENTS

| | | |
|---|---|---|
| CN | 111447440 A | 7/2020 |
| CN | 111937389 A | 11/2020 |
| EP | 3066833 A1 | 9/2016 |
| EP | 3606069 A1 | 2/2020 |
| WO | WO 2021015934 A1 | 1/2021 |

OTHER PUBLICATIONS

Tencent Technology, IPRP, PCT/CN2021/136122, Aug. 3, 2023, 6 pgs.
Tencent Technology, ISR, PCT/CN2021/136122, Mar. 7, 2022, 2 pgs.

\* cited by examiner

VIDEO ENCODING METHOD AND APPARATUS, VIDEO DECODING METHOD AND APPARATUS, COMPUTER PROGRAM PRODUCT, COMPUTER-READABLE STORAGE MEDIUM, AND ELECTRONIC DEVICE

CROSS-REFERENCE TO RELATED APPLICATIONS

This application is a continuation application of PCT Patent Application No. PCT/CN2021/136122, entitled "VIDEO ENCODING AND DECODING METHOD AND APPARATUS, COMPUTER PROGRAM PRODUCT, COMPUTER-READABLE STORAGE MEDIUM, AND ELECTRONIC DEVICE" filed on Dec. 7, 2021, which claims priority to Chinese Patent Application No. 202110164797.9, filed with the State Intellectual Property Office of the People's Republic of China on Feb. 5, 2021, and entitled "VIDEO ENCODING AND DECODING METHOD AND DEVICE, COMPUTER READABLE MEDIUM AND ELECTRONIC EQUIPMENT", all of which are incorporated herein by reference in their entirety.

FIELD OF THE TECHNOLOGY

The present disclosure relates to the field of video encoding and decoding technologies, and in particular, to a video encoding method and apparatus, a video decoding method and apparatus, a computer program product, a computer-readable storage medium, and an electronic device.

BACKGROUND OF THE DISCLOSURE

As users are having higher requirements on the resolution and frame frequency of video images, the volume of video data is increased, which generally requires a large storage space for storage or a wide bandwidth for transmission. Currently, video encoding and decoding technologies are used in the industry to compress videos, so that the videos can be stored or transmitted in the compressed format.

Modern mainstream video coding technologies mainly include international video coding standards such as High Efficiency Video Coding (HEVC) and Versatile Video Coding (VVC) and China's national video coding standards such as Audio Video coding Standard (AVS), all of which use a hybrid coding framework to process the input original video signal. However, in the existing video coding and decoding standards, a video image is generally partitioned into a series of non-overlapping rectangular coding blocks or decoding blocks according to a block partition structure. Then, an appropriate coding method is selected for each coding block, and correspondingly, a decoding block is decoded in a manner corresponding to the coding method. For coding blocks using intra prediction, only one of the specified intra prediction modes can be selected to derive a predicted value of the current coding/decoding block. There are multiple textures in a rectangular block, for which the current intra prediction methods cannot obtain an accurate predicted value.

It should be noted that, the information disclosed in the above background part is used only for enhancing the understanding of the background of the present disclosure, and therefore may include information that does not constitute the related art known to a person of ordinary skill in the art.

SUMMARY

Embodiments of the present disclosure provide a video decoding method, a video decoding apparatus, a computer program product, a computer-readable storage medium, and an electronic device, so as to improve the accuracy of predicted values derived from different coding/decoding blocks to a certain extent, to improve the encoding and decoding efficiency.

Other features and advantages of the present disclosure become obvious through the following detailed descriptions, or may be partially learned partially through the practice of the present disclosure.

According to an aspect of the embodiments of the present disclosure, a video decoding method is provided, including: decoding a bitstream to obtain a first flag, a first index value, and a second index value, the first flag being used for identifying whether to use an intra weighted prediction mode for a current block; determining a target intra prediction mode in a first intra prediction mode list according to the first index value and determining a target weighting list in a weighting list set according to the second index value, in response to a value of the first flag satisfying a first preset condition; determining reference samples of a first category and reference samples of a second category according to reference samples corresponding to the current block, and weighting the reference samples of the first category and the reference samples of the second category based on the target weighting list to obtain weighted reference samples; and predicting samples the in the current block according to the weighted reference samples and the target intra prediction mode to obtain predicted samples of the current block.

According to an aspect of the embodiments of the present disclosure, a video decoding apparatus is provided, including: a bitstream decoding module, configured to decode a bitstream to obtain a first flag, a first index value, and a second index value, the first flag being used for identifying whether to use an intra weighted prediction mode for a current block; an index matching module, configured to determine a target intra prediction mode in a first intra prediction mode list according to the first index value and determine a target weighting list in a weighting list set according to the second index value, in response to a value of the first flag satisfying a first preset condition; a pixel weighting module, configured to determine reference samples of a first category and reference samples of a second category according to reference samples corresponding to the current block, and weight the reference samples of the first category and the reference samples of the second category based on the target weighting list to obtain weighted reference samples; and a pixel prediction module, configured to predict samples the in the current block according to the weighted reference samples and the target intra prediction mode to obtain predicted samples of the current block.

According to an aspect of the embodiments of the present disclosure, a video encoding method is provided, including: determining a target intra prediction mode corresponding to a current block in an intra prediction mode list, and determining a target weighting list corresponding to the current block in a weighting list set; determining reference samples of a first category and reference samples of a second category according to reference samples corresponding to the current block, and weighting the reference samples of the first category and the reference samples of the second category based on the target weighting list to obtain weighted reference samples; predicting samples in the current block according to the weighted reference samples and the target intra prediction mode to obtain a predicted block corresponding to the current block; forming a bitstream according to the predicted block, and adding a first flag, a first index value, and a second index value to the bitstream, the first flag being used for identifying whether to use an intra weighted prediction mode for a block to be decoded; the first index value being used for determining a target intra prediction mode corresponding to the block to be decoded in a first intra prediction mode list; and the second index value being used for determining a target weighting list corresponding to the block to be decoded in the weighting list set.

According to an aspect of the embodiments of the present disclosure, a video encoding apparatus is provided, including: a determining module, configured to determine a target intra prediction mode corresponding to a current block in an intra prediction mode list, and determine a target weighting list corresponding to the current block in a weighting list set; a weighting module, configured to determine reference samples of a first category and reference samples of a second category according to reference samples corresponding to the current block, and weight the reference samples of the first category and the reference samples of the second category based on the target weighting list to obtain weighted reference samples; a prediction module, configured to predict the current block according to the weighted reference samples and the target intra prediction mode to obtain a predicted block corresponding to the current block; a bitstream generation module, configured to form a bitstream according to the predicted block, and add a first flag, a first index value, and a second index value to the bitstream, the first flag being used for identifying whether to use an intra weighted prediction mode for a block to be decoded; the first index value being used for determining a target intra prediction mode corresponding to the block to be decoded in a first intra prediction mode list; and the second index value being used for determining a target weighting list corresponding to the block to be decoded in the weighting list set.

According to an aspect of the embodiments of this application, a non-transitory computer storage medium is provided, storing a computer program, the computer program, when executed by a processor of an electronic device, causing the electronic device to implement the video decoding method and the video coding method according to the foregoing embodiments.

According to an aspect of the embodiments of this application, a computer program product or a computer program is provided, the computer program product or the computer program including computer instructions, the computer instructions being stored in a non-transitory computer-readable storage medium. A processor of a computer device reads the computer instructions from the computer-readable storage medium, and executes the computer instructions, so that the computer device performs the video decoding method and the video encoding method provided in the various implementations in the foregoing aspects.

According to an aspect of the embodiments of the present disclosure, an electronic device is provided, including: one or more processors; a storage apparatus, configured to store one or more programs, the one or more programs, when being executed by the one or more processors, causing the electronic device to perform the method provided in the implementations.

On the one hand, the present disclosure can perform weighted combination of two types of intra prediction reference samples, and derive a predicted value based on the weighted-combined reference samples, thereby improving the accuracy of the predicted value. On the other hand, the prediction method in the present disclosure can be applied to video encoding and decoding, thereby improving the encoding and decoding efficiency.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings herein, which are incorporated into the specification and constitute a part of this specification, show embodiments that conform to this application, and are used for describing a principle of this application together with this specification. Apparently, the accompanying drawings in the following description show merely some embodiments of the present disclosure, and a person of ordinary skill in the art may still derive other accompanying drawings from these accompanying drawings without creative efforts. In the drawings.

DESCRIPTION OF EMBODIMENTS

Now, exemplary implementations are described comprehensively with reference to the accompanying drawings. However, the examples of implementations may be implemented in various forms, and it should not be understood as being limited to the examples described herein. Conversely, the implementations are provided to make the present disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, a lot of specific details are provided to give a full understanding of the embodiments of this application. However, a person skilled in the art is to be aware of that, the technical solutions in this application may be implemented without one or more of the particular details, or other methods, unit, apparatus, or step may be adopted. In other cases, well-known methods, apparatuses, implementations, or operations are not shown or described in detail, to avoid obscuring the aspects of this application.

The block diagrams shown in the accompanying drawings is merely a functional entity and does not necessarily correspond to a physically independent entity. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

Figure 1:
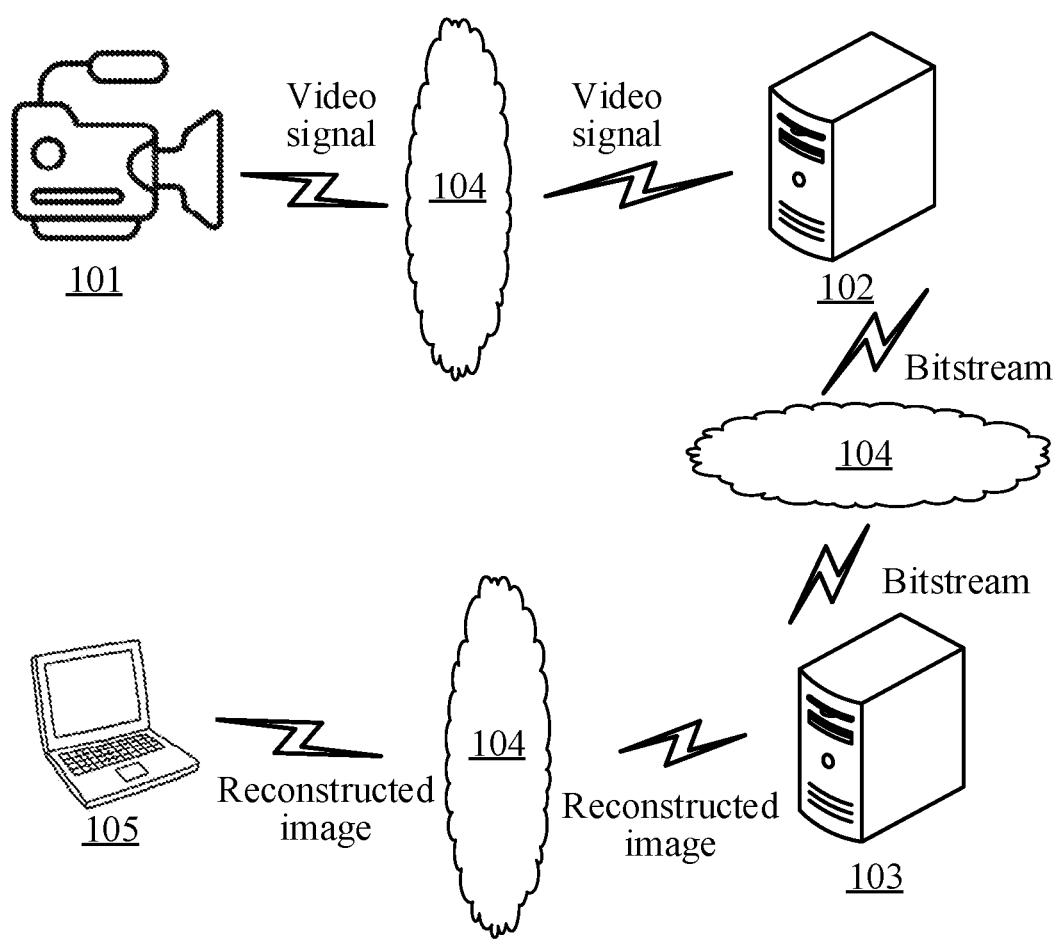
FIG. 1 shows a schematic diagram of an exemplary system architecture to which a technical solution according to an embodiment of this application is applicable.

FIG. 1 is a schematic diagram of an exemplary system architecture to which a technical solution according to an embodiment of the present disclosure is applicable.

As shown in FIG. 1, the system architecture may include a first terminal device 101, an encoder 102, a decoder 103, and a network 104 and a second terminal device 105. The first terminal device 101 may specifically be a terminal device that includes a display screen and can be configured to capture or produce a video, such as a smartphone, a notebook, tablet computer, a desktop computer, a portable computer, a video camera, a camera, etc., and is configured to capture a video Signal. The encoder 102 is configured to encode and compress the video signal captured by the first terminal device 101, so as to reduce the data volume of the video. The decoder 103 is configured to decode a bitstream outputted by the encoder 102, and predict the encoded and compressed video image, to obtain a reconstructed image. The second terminal device 105 may specifically be a terminal device that includes a display screen, such as a TV, a smartphone, a notebook, a tablet computer, a desktop computer, a portable computer, etc., and is configured to play a video composed of reconstructed images. The network 104 is a medium used to provide a communication link between the first terminal device 101 and the encoder 102, between the encoder 102 and the decoder 103, and between the decoder and the second terminal device 105. The network 104 may include various connection types such as a wired communication link, a wireless communication link, etc. In the embodiments of the present disclosure, a network between the terminal device 101 and a server 103 may be a wireless communication link, and may specifically be a mobile network.

It should be understood that quantities of the first terminal devices, the encoders, the decoders, the networks, and the second terminal devices in FIG. 1 are only schematic. According to implementation requirements, there may be any quantity of the first terminal devices, the encoders, the decoders, the networks, and the second terminal devices. It should be noted that the encoder and the decoder, or the encoder, the decoder and the second terminal device in the present disclosure may also be an independent integrated terminal, and multiple functions may be implemented in the integrated terminal.

In some embodiments, the first terminal device 101 captures or produces a video, and transmits an original video signal to the encoder 102 through the network 104. After receiving the original video signal, the encoder 102 encodes and compresses the video signal using an intra weighted prediction mode to form a bitstream. The bitstream further contains parameters required for decoding the compressed video signal, such as an intra prediction mode, a decoding-related flag, and indexes, and the like. After receiving the bitstream, the decoder 103 may decode the bitstream to obtain the parameters and to-be-decoded video data therein, predict the to-be-decoded video data according to the intra weighted prediction mode, then obtain a reconstructed video signal corresponding to the original video signal, and transmit the reconstructed video signal to the second terminal device 105 for display.

It should be noted that, the video decoding method provided in this embodiment of this application is generally performed by the terminal device, and correspondingly, the video decoding apparatus is generally disposed in the terminal device. However, in other embodiments of the present disclosure, the video decoding method provided in the embodiments of the present disclosure may be alternatively performed by a server.

Before the technical solutions of the present disclosure are described in detail, video encoding and decoding technologies in the related art are briefly introduced first. Modern mainstream video coding technologies, for example, international video coding standards HEVC and VVC and China's national video coding standard AVS, adopt a hybrid coding framework, and perform a series of operations and processing on an inputted original video signal as follows:

1) Block Partition Structure: An inputted image is partitioned into a plurality of non-overlapping processing units. Similar compression operations are performed on each processing unit. The processing unit is referred to as a coding tree unit (CTU) or a largest coding unit (LCU). The CTU may be further partitioned more finely to obtain one or more basic coding units (CU). Each CU is the most basic element in an encoding process. Various possible encoding modes for each CU are described below.

2) Predictive coding: Predictive coding includes an intra-frame prediction mode, an inter-frame prediction mode, and the like. A residual video signal is obtained after the prediction of a raw video signal through a selected reconstructed video signal. An encoder side needs to select a most suitable one for a current CU from many possible predictive coding modes, and informs a decoder side. Intra prediction means that a predicted signal comes from a region that has been coded and reconstructed in a same image. Inter-frame prediction means that a predicted signal is from another encoded image (referred to as a reference image) different from a current image.

3) Transform and Quantization: Transform operations such as Discrete Fourier Transform (DFT) and Discrete Cosine Transform (DCT) are performed on a residual video signal to convert the signal into a transform domain, which is referred to as a transform coefficient. A lossy quantization operation is further performed on a signal in the transform domain, and certain information is discarded, so that a quantized signal is readily available for compression and expression. In some video coding standards, there may be more than one transform modes for selection. Therefore, the encoding end also needs to select one transform mode for the current CU and informs the decoding end of the mode. Fineness of quantization is usually determined by a quantization parameter (QP). A larger QP value indicates that coefficients with larger value ranges are quantized into a same output, usually resulting in greater distortion and a lower bit rate. Conversely, a smaller QP value indicates that coefficients with smaller value ranges are quantized into a same output, usually resulting in less distortion and corresponding to a higher bit rate.

4) Entropy coding or statistical coding: Statistical compression coding is performed on the quantized signal in the transform domain according to a frequency of occurrence of each value, and finally a binarized (0 or 1) compressed bitstream is outputted. In addition, other information such as a selected mode and a motion vector generated through coding also require entropy coding to reduce a bit rate. The statistical encoding is a lossless encoding manner that can validly reduce a code rate required to express a same signal. A common statistical coding mode is Variable Length Coding (VLC) or Content Adaptive Binary Arithmetic Coding (CABAC).

5) Loop filtering: A reconstructed decoded image may be obtained by performing operations such as inverse quantization, inverse transform, and predictive compensation (inverse operations of 2 to 4 in the foregoing) on an encoded image. Compared with a raw image, in a reconstructed image, some information may be different from that in the raw image due to the impact of quantization, causing a distortion. A filtering operation is performed on the reconstructed image, for example, by using filters such as a deblocking filter (DB), a sample adaptive offset (SAO) filter, or an adaptive low-pass filter (ALF), which can validly reduce a degree of distortion caused by quantization.

Next, the intra prediction technology in the related art will be described.

Figure 2:
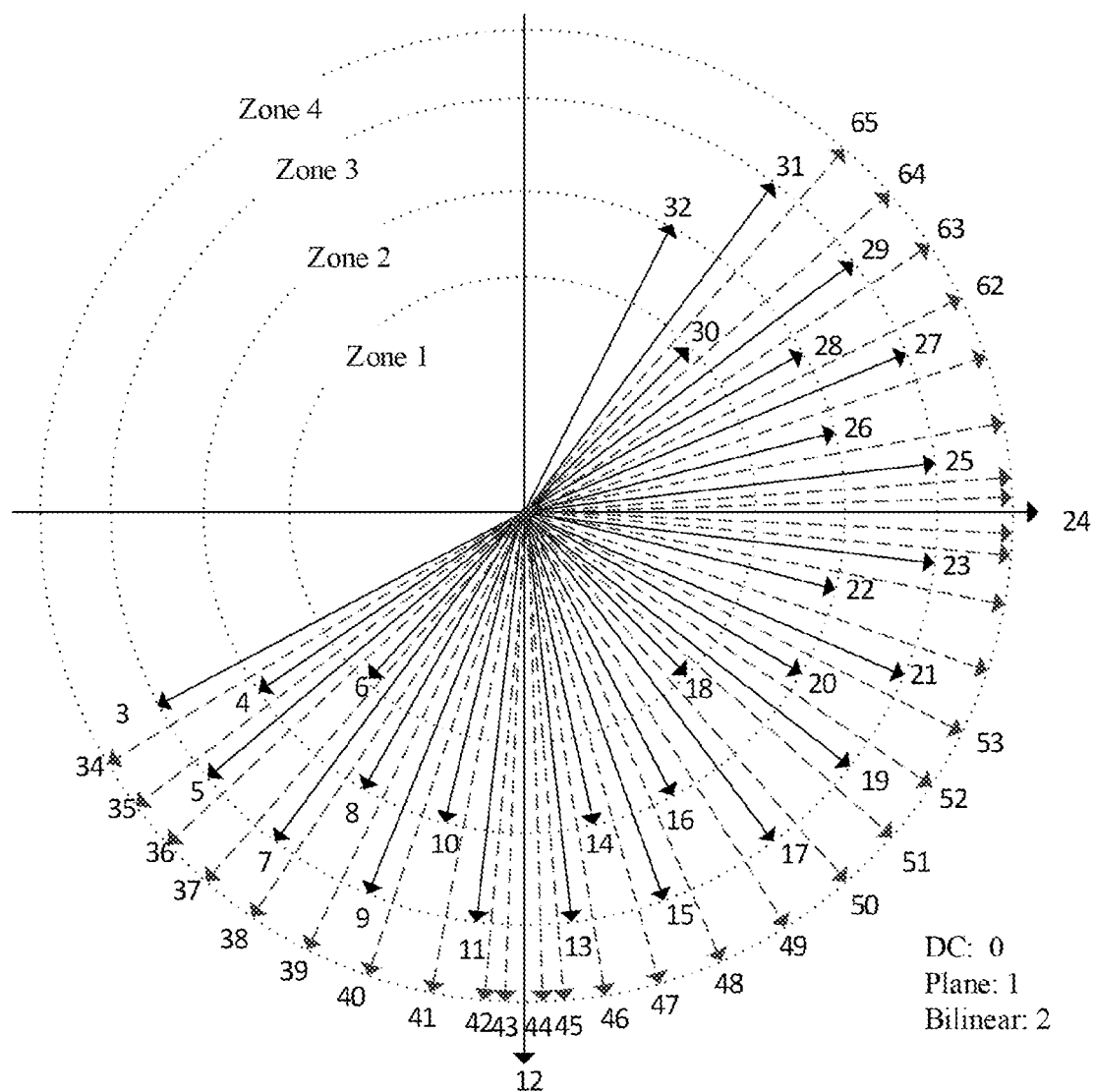
FIG. 2 schematically shows a schematic structural diagram of an intra prediction mode.

Intra prediction is a commonly used predictive coding technique. For intra prediction, a predicted value of a current CU is derived from an adjacent encoded area based on a correlation of a pixel in a video image in a spatial domain. There are a total of 33 intra prediction modes in AVS2, including 30 angular modes and 3 special modes (for example, Plane mode, DC mode and Bilinear mode) which are coded using a most probable mode (MPM), with the remaining modes being coded using 5-bit fixed-length coding. In order to support finer angle prediction, the second stage of AVS3 adopts the Extended Intra Prediction Mode (EIPM). In AVS3, the number of angular prediction modes is expanded to 62, as shown in FIG. 2, where arrowed solid lines represent original angular prediction modes, and arrowed dashed lines represent new angular modes. The serial numbers of the original angular modes remain unchanged, and serial numbers of the new angular modes are 34 to 65. When an angular prediction mode is used, for a pixel in a current predicted block, a value of a reference sample at a corresponding position in a reference sample row or column is used as a predicted value according to a direction corresponding to an angle of the prediction mode.

In the video coding standards in the related art, a video image is generally divided into a series of non-overlapping rectangular coding/decoding blocks according to the block partition structure, and then an appropriate coding mode is selected for each coding block. For a coding block using intra prediction, only one of the specified intra prediction modes can be selected to derive the predicted value of the current coding/decoding block, leading to low coding efficiency and low accuracy of the predicted value. For a rectangular block having multiple textures, the current intra prediction methods cannot provide an accurate predicted value.

In order to overcome the problems in the related art, the present disclosure first proposes a video decoding method. Since a video encoding method corresponds to the video decoding method, the technical solutions of the present disclosure are mainly described from the decoder side in exemplary embodiments of the present disclosure.

Figure 3:
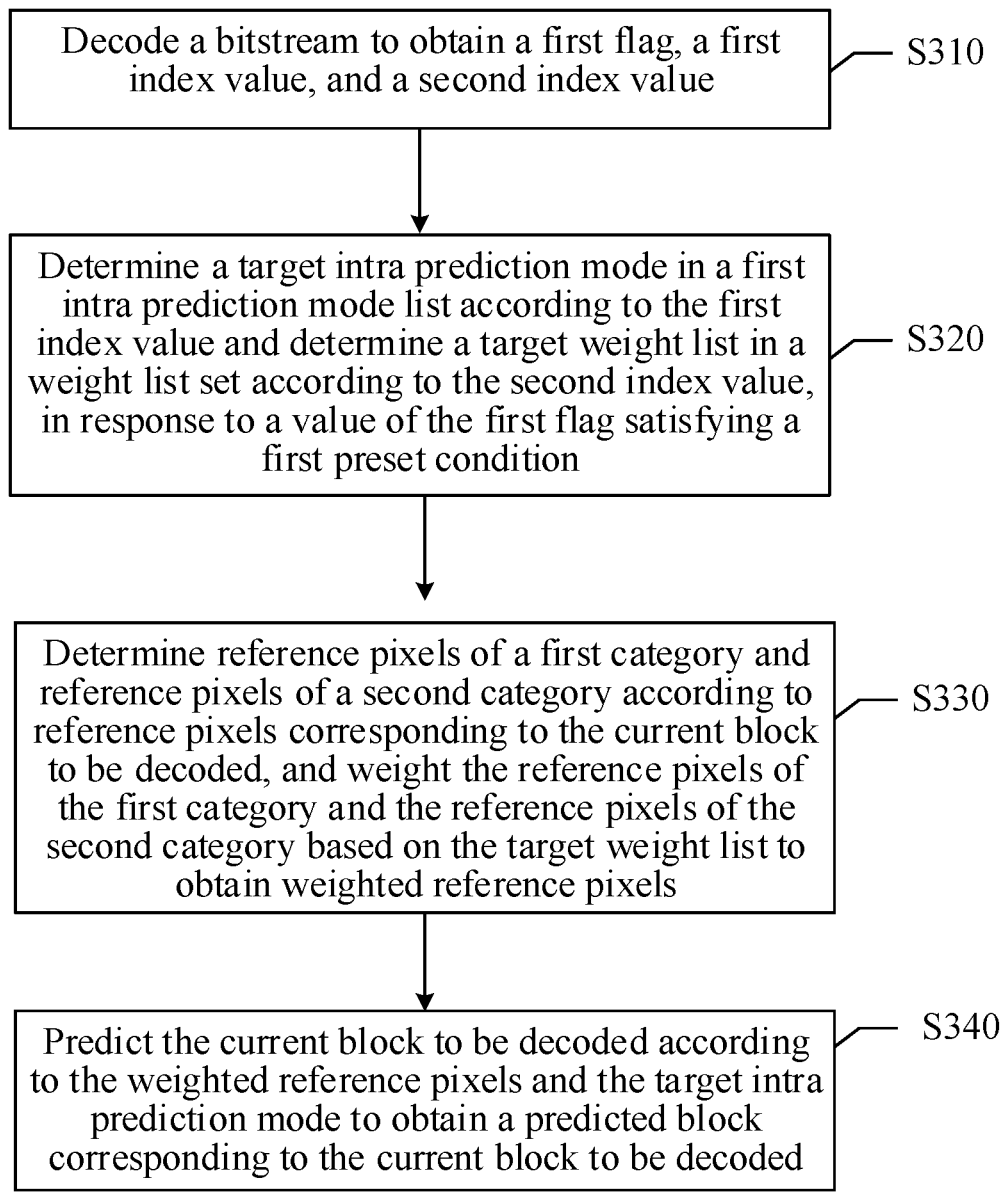
FIG. 3 schematically shows a schematic flowchart of a video decoding method according to an embodiment of the present disclosure.

FIG. 3 schematically shows a flowchart of a video decoding method according to an embodiment of the present disclosure. The video decoding method may be performed by a decoder. The decoder may be the decoder 103 shown in FIG. 1. Referring to FIG. 3, the video decoding method at least includes steps S310 to S340, which are described in detail as follows:

In step S310, decode a bitstream to obtain a first flag, a first index value, and a second index value.

As an example, the first flag is used for identifying whether to use an intra weighted prediction mode for a current block.

In some embodiments, after the original video signal is captured or produced, an encoder needs to be used to encode and compress the original video signal in order to compress the volume of the original video signal. During compression, the encoder generally selects one or more predictive coding modes among multiple predictive coding modes for compression coding. Even in the same image, image textures at different positions are different, so after an image is divided into multiple coding units, different predictive coding modes may be selected for coding for different coding units, so as to obtain a bitstream formed by the final compressed coded data. In addition, the process that the decoder decodes the compressed encoded data obtained through compression by the encoder to form a reconstructed image may be regarded as an inverse process of the encoding process. Therefore, the decoder needs to decode a block to be decoded corresponding to a coding unit according to a prediction mode and other parameters used by the encoder to encode the coding unit, and therefore, in addition to the encoded video data, it is also necessary to write a flag or index value for instructing to obtain the required parameters in the bitstream.

In an embodiment of the present disclosure, the bitstream includes a first flag, where the first flag is used for identifying whether to use an intra weighted prediction mode (IWP) for the block to be decoded, so the first flag may be obtained by decoding the bitstream, and an intra prediction mode to be used for the current block may be determined according to the first flag. Specifically, when a value of the first flag satisfies a first preset condition, the intra weighted prediction mode is used to predict the current block; when the value of the first flag does not satisfy the first preset condition, the intra weighted prediction mode is not used to predict the current block. In an embodiment of the present disclosure, the first flag may be marked as cu_flag_iwp, and its value may be 0 or 1. The first preset condition may specifically be cu_flag_iwp=1. To be specific, when cu_flag_iwp=1, the IWP prediction mode is used to predict the current block; when cu_flag_iwp=0, the IWP prediction mode is not used to predict the current block. It is worth noting that the value of the first flag may also be other values than 0 and 1, as long as it can be clearly indicated whether to use the intra weighted prediction mode.

In order to improve the processing efficiency, other information may also be obtained before obtaining the first flag, and according to the other information, it is determined whether further decoding is required to obtain the first flag, so as to determine whether to use the IWP prediction mode for the current block. In an embodiment of the present disclosure, the other information may be a width and a height of the current block, an image header flag, a sequence header flag, etc. For example, whether to use the IWP prediction mode for the current block is determined according to the width and the height of the current block. For example, the width and the height of the current block are obtained. If the width and the height of the current block satisfy a third preset condition, the bitstream needs to be decoded to obtain the first flag, and it is determined according to the value of the first flag whether the IWP prediction mode can be used for each block to be decoded. If the width and the height of the current block do not satisfy the third preset condition, there is no need to decode the bitstream to obtain the first flag, and the value of the first flag is 0 by default, that is, the IWP prediction mode cannot be used for any of the current blocks to be decoded. The third preset condition may be set according to actual needs. For example, the third preset condition may be set to be that when the height and the width of the current block are both greater than or equal to 8, the bitstream needs to be decoded to obtain the first flag, and it is determined according to the value of the first flag whether the IWP prediction mode can be used for each block to be decoded. The conditions that the height and width need to meet may also be set to be different from each other in the third preset condition. For example, the third preset condition may be set to be that the IWP prediction mode is allowed to be used when the height of the current block is greater than 8 and the width of the current block is greater than 10, and so on, which is not particularly limited in the embodiments of the present disclosure.

The image header flag is used for identifying whether the IWP prediction mode can be used for multiple blocks to be decoded in the same video image. If it is determined that the IWP prediction mode cannot be used according to the image header flag, there is no need to decode the bitstream to obtain the first flag, that is, the IWP prediction mode cannot be used for any of the blocks to be decoded in the current image. If it is determined that the IWP prediction mode can be used according to the image header flag, the bitstream needs to be decoded to obtain the first flag, and it is determined according to the value of the first flag whether the IWP prediction mode can be used for each block to be decoded. For example, the image header flag may be marked as pic_header_flag_iwp, and its value may be set to 0 or 1. When pic_header_flag_iwp=0, the cu_flag_iwp of all the blocks to be decoded in the current image is 0, and there is no need to decode the bitstream, that is, the IWP prediction mode cannot be used for any of the blocks to be decoded in the current image. When pic_header_flag_iwp=1, it is necessary to decode and obtain the cu_flag_iwp of all the blocks to be decoded in the current image, and determine whether to use the IWP prediction mode for each block to be decoded according to the cu_flag_iwp corresponding to the each block to be decoded.

The sequence header flag is used for identifying whether the IWP prediction mode can be used for all blocks to be decoded in an image sequence. Only when the sequence header flag indicates that the IWP prediction mode can be used for all the blocks to be decoded in the image sequence, the bitstream needs to be further decoded to obtain the image header flag and the first flag, or obtain only the first flag if the image header flag does not exist, and then it is determined according to the value of the first flag whether the IWP prediction mode can be used for the blocks to be decoded. For example, the sequence header flag may be marked as seq_header_flag_iwp, and its value may be 0 or 1. When seq_header_flag_iwp=0, the IWP prediction mode cannot be used for any of the blocks to be decoded in the current image sequence, so there is no need to decode the bitstream to obtain cu_flag_iwp or obtain pic_header_flag_iwp and cu_flag_iwp. When seq_header_flag_iwp=1, the bitstream needs to be decoded to obtain the cu_flag_iwp or the pic_header_flag_iwp and cu_flag_iwp of all the blocks to be decoded in the image sequence, and it is determined according to the cu_flag_iwp corresponding to each block to be decoded whether to use the IWP prediction mode for the block to be decoded.

According to the width and height and/or the image header flag and/or the sequence header flag of the block to be decoded, it may be quickly determined whether the IWP prediction mode can be used for multiple blocks to be decoded in the same image or multiple blocks to be decoded in an image sequence. Compared to the method of determining one by one according to the first flag of each block to be decoded whether the IWP prediction mode can be used, the data processing efficiency is improved.

In addition, other methods may also be used to determine whether to use the IWP prediction mode for the current block. For example, an intra prediction mode may be obtained through decoding, it may be determined according to the intra prediction mode whether the first flag needs to be obtained through decoding, and it may be determined according to the value of the first flag whether to use the IWP prediction mode for the current block. As a specific example, only when the intra prediction mode is the angular mode, cu_flag_iwp needs to be obtained through decoding; otherwise, cu_flag_iwp=0, that is, the IWP prediction mode is not used for the current block. Of course, other determining manners may also be used, which will not be detailed in the embodiments of the present disclosure.

In step S320, determine a target intra prediction mode in a first intra prediction mode list according to the first index value and determine a target weighting list in a weighting list set according to the second index value, in response to a value of the first flag satisfying a first preset condition.

In an embodiment of the present disclosure, after it is determined to use the IWP prediction mode for the current block, the target intra prediction mode and the target weighting list corresponding to the current block may be obtained; then weighted reference samples are determined according to the reference samples, the target intra prediction mode, and the target weighting list of the current block, and the current block is predicted according to the weighted reference samples. In an embodiment of the present disclosure, both the target intra prediction mode and the target weighting list may be determined by matching. To be specific, the target intra prediction mode may be obtained by matching in the first intra prediction mode list according to the first index value obtained by decoding, and the target weighting list may be obtained by matching in the weighting list set according to the second index value obtained by decoding.

The first intra prediction mode list includes a plurality of intra prediction modes and serial numbers corresponding to each of the intra prediction modes. For example, serial number 1 corresponds to an intra prediction mode numbered 3, and so on. After obtaining the first index value, the first index value may be matched against the serial numbers in the first intra prediction mode list to obtain a target serial number matching the first index value; and then the intra prediction mode corresponding to the target serial number is determined as the target intra prediction mode.

Figure 4:
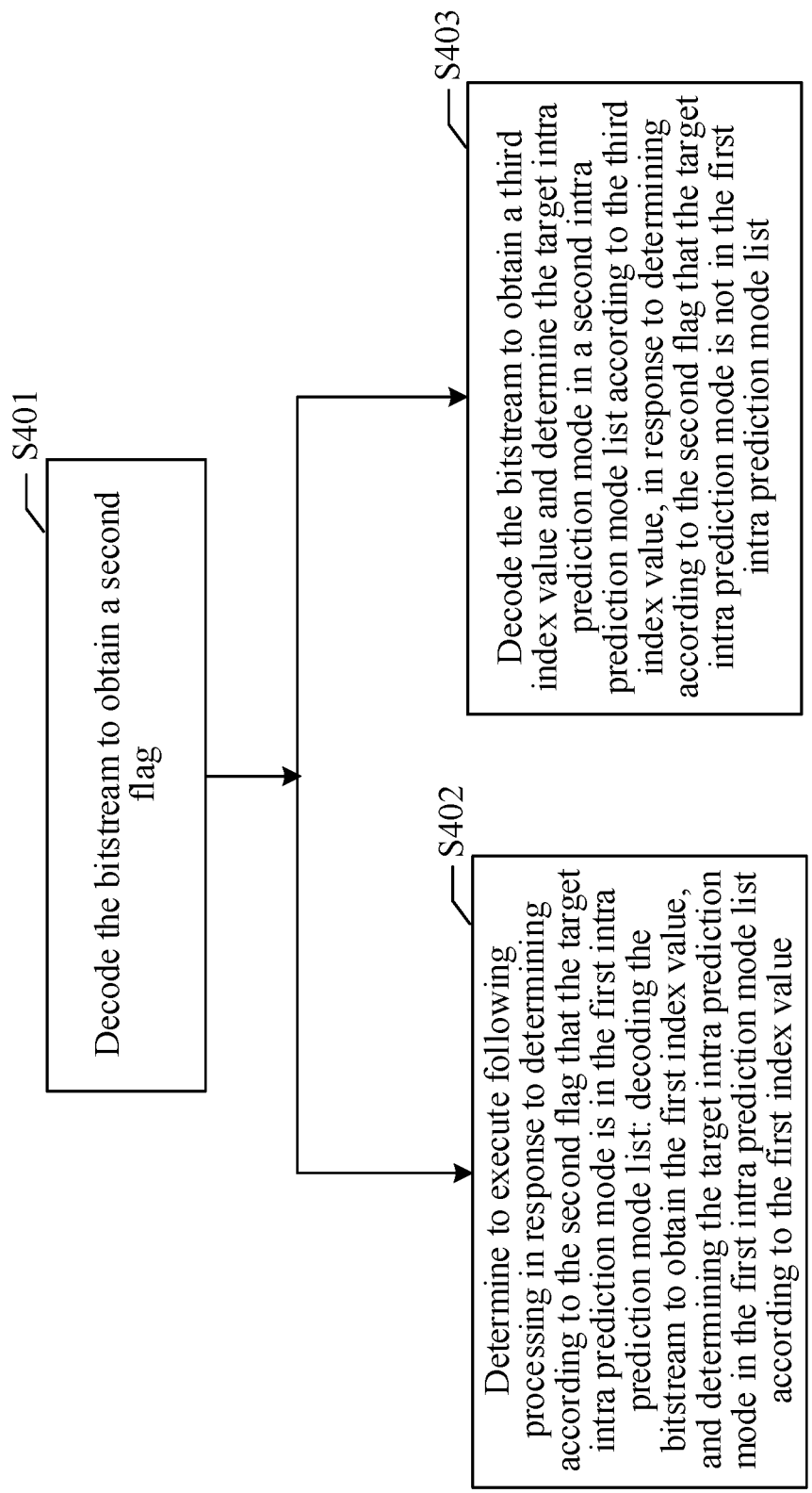
FIG. 4 schematically shows a schematic flowchart of obtaining a target intra prediction mode according to an embodiment of the present disclosure.

The first intra prediction mode list may contain all possible intra prediction modes, but when the first intra prediction mode list is set to have a maximum length, the first intra prediction mode list may not contain all the possible intra prediction modes. Therefore, when obtaining the target intra prediction mode, it is necessary to determine whether the target intra prediction mode is in the first intra prediction mode list. If the target intra prediction mode does not exist in the first intra prediction mode list, the target intra prediction mode needs to be obtained from other intra prediction mode lists. In an embodiment of the present disclosure, how to obtain the target intra prediction mode may be determined according to the second flag related to the target intra prediction mode in the bitstream. FIG. 4 is a schematic flowchart of obtaining a target intra prediction mode. As shown in FIG. 4, in step S401, decode the bitstream to obtain a second flag. In step S402, determine the target intra prediction mode in the first intra prediction mode list according to the first index value in response to determining according to the second flag that the target intra prediction mode is in the first intra prediction mode list. In step S403, decode the bitstream to obtain a third index value and determine the target intra prediction mode in a second intra prediction mode list according to the third index value, in response to determining according to the second flag that the target intra prediction mode is not in the first intra prediction mode list, the intra prediction modes included in the first intra prediction mode list being different from those included in the second intra prediction mode list. Through the schematic flowchart shown in FIG. 4, a unique target intra prediction mode may be determined.

The decoder side determines the intra prediction mode for prediction according to the index value sent by the encoder side, so the decoder side may form the first intra prediction mode list and the second intra prediction mode list according to the intra prediction mode used in each prediction and a preset intra prediction mode. How to form the first intra prediction mode list and the second intra prediction mode list will be described below.

First, an intra prediction mode among most probable modes (MPMs) is added to the first intra prediction mode list, where the intra prediction mode among the MPMs may be an intra prediction mode corresponding to a decoded block adjacent to the current block. Next, an intra prediction mode of a spatially adjacent intra predicted block other than the MPMs, for example, an intra prediction mode corresponding to a decoded block in an image frame adjacent to the current block, may be added to the first intra prediction mode list. Then a preset intra angular prediction mode may be added to the first intra prediction mode list. For example, an intra prediction mode numbered 3-32 may be added to the first intra prediction mode list. As an example, in addition to adding the angular prediction mode among the intra prediction modes to the first intra prediction mode list, a special prediction mode among the intra prediction modes may also be added to the first intra prediction mode list. For example, a bilinear mode and a plane mode may be added to the first intra prediction mode list. It is worth noting that a direct current (DC) mode is not included in the first intra prediction mode list. If a mode to be added is the DC mode, the addition may be skipped or the DC mode may be replaced by another intra prediction mode. This is because in the embodiments of the present disclosure, the DC mode is used when determining the reference samples of the second category, and in order to ensure the technical effect that the technical solution can achieve, the first intra prediction mode list does not include the DC mode.

As an example, when intra prediction modes are added to the first intra prediction mode list, deduplication processing is required to ensure that the intra prediction modes in the first intra prediction mode list are different from each other. The first intra prediction mode list may include all possible prediction modes. Of course, a preset length may be set for the first intra prediction mode list. When the first intra prediction mode list reaches the preset length, no new prediction modes will be added.

Figure 5:
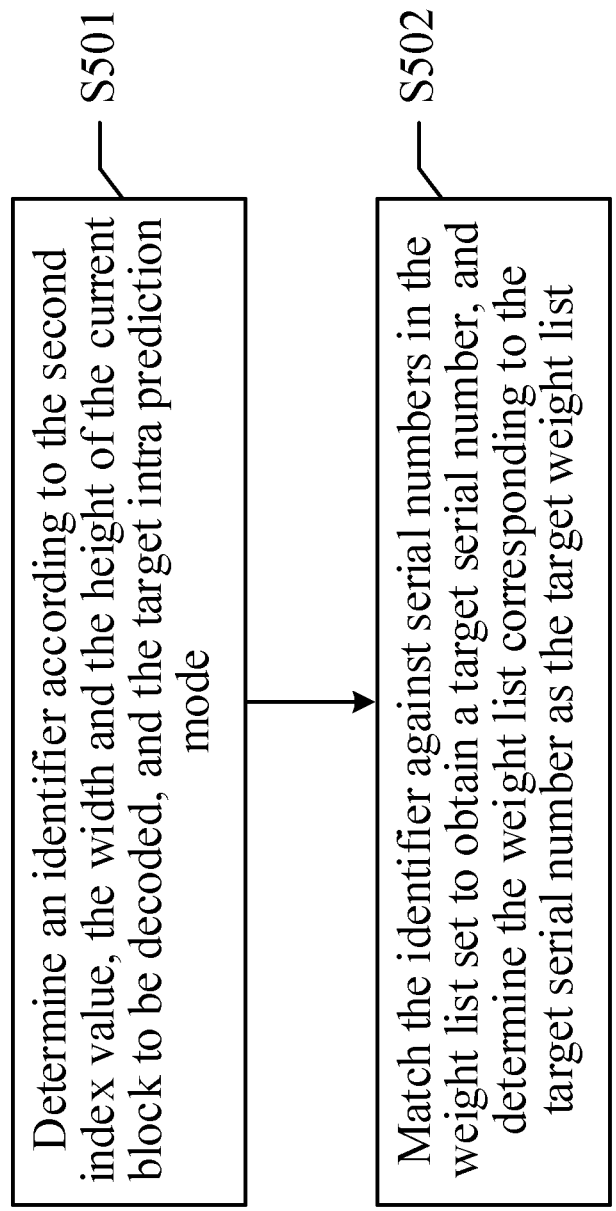
FIG. 5 schematically shows a schematic flowchart of determining a target weighting list according to an embodiment of the present disclosure.

Similar to the determination of the target intra prediction mode, the target weighting list may also be determined by matching according to an index value. In an embodiment of the present disclosure, the target weighting list is a weighting list composed of weights of the reference samples corresponding to the current block, and the reference samples of the first category and the reference samples of the second category may be weighted according to the target weighting list to obtain the weighted reference samples. FIG. 5 is a schematic flowchart of determining a target weighting list. As shown in FIG. 5, in step S501, determine an identifier according to the second index value, the width and the height of the current block, and the target intra prediction mode. In step S502, match the identifier against serial numbers in the weighting list set to obtain a target serial number, and determine the weighting list corresponding to the target serial number as the target weighting list. In an embodiment of the present disclosure, the weighting list set includes a plurality of weighting lists and serial numbers corresponding to the weighting lists, and the serial numbers are generated based on index values, intra prediction modes, and a width and a height of the block to be decoded. The index value is of the same type as the second index value. Therefore, determining the target weighting list corresponding to the current block may include: obtaining the corresponding first index value and second index value from the bitstream, determining an intra prediction mode corresponding to the first index value, generating an identifier according to the second index value, the intra prediction mode, and the width and height of the current block, and matching the identifier against the identifiers in the weighting list set to obtain the target weighting list corresponding to the identifier. In addition to the above method for determining the target weighting list, the target weighting list may also be determined according to other methods, which will not be detailed in the embodiments of the present disclosure.

In an embodiment of the present disclosure, when there is only one corresponding weighting list determined in the weighting list set according to the intra prediction mode and the width and height of the current block, it may not be necessary to decode the bitstream to obtain the second index value and determine the target weighting list according to the second index value, but instead, the target weighting list corresponding to the current block may be directly obtained from the weighting list set.

Figure 6:
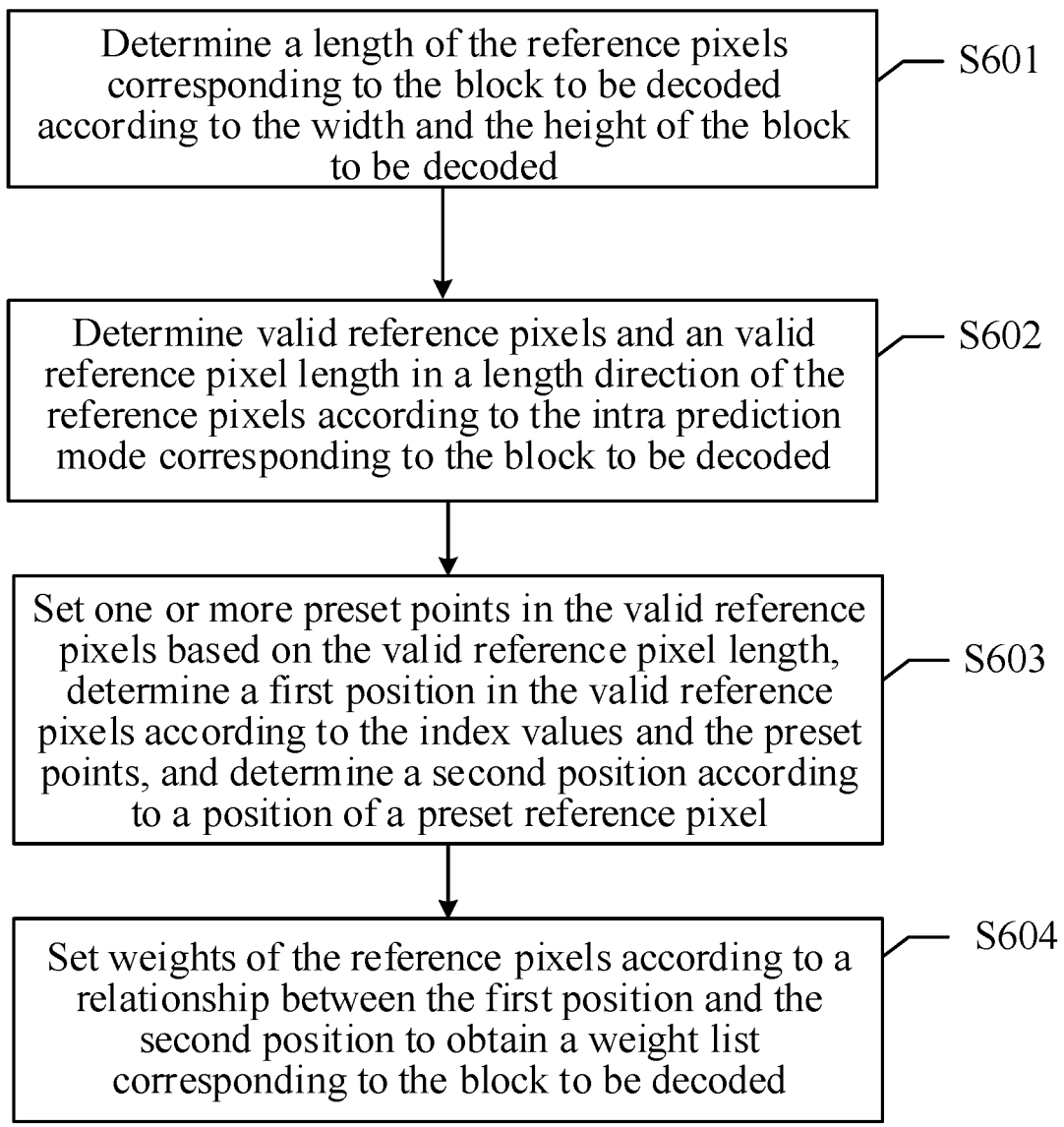
FIG. 6 schematically shows a schematic flowchart of determining a weighting list according to an embodiment of the present disclosure.

In an embodiment of the present disclosure, the weighting list may be derived according to the valid reference samples. To be specific, the weighting list corresponding to the block to be decoded may be determined according to the intra prediction mode corresponding to the block to be decoded and the width and the height of the block to be decoded. FIG. 6 is a schematic flowchart of determining a weighting list. As shown in FIG. 6, detailed steps are as follows.

In step S601, determine a length of the reference samples corresponding to the block to be decoded according to the width and the height of the block to be decoded.

Figure 7:
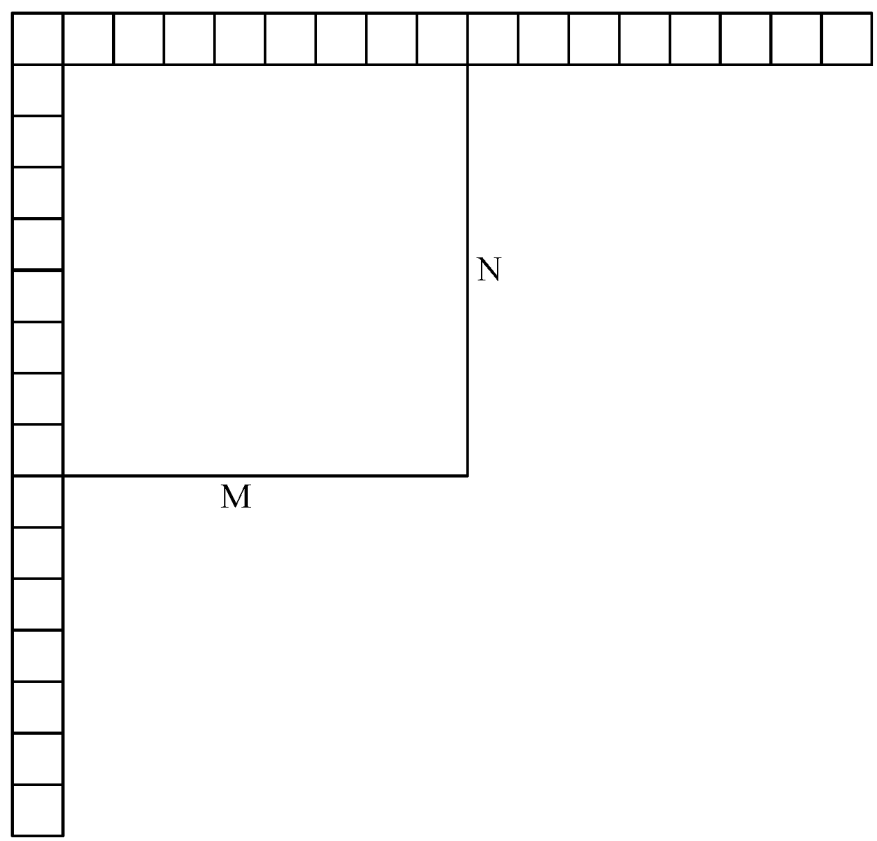
FIG. 7 schematically shows a schematic structural diagram of a length of reference samples determined according to a width and a height of a block to be decoded according to an embodiment of the present disclosure.

In an embodiment of the present disclosure, a length of a reference weighting list is equal to the length of the reference samples, and the length of the reference samples is related to the width and height of the block to be decoded. If the width of the block to be decoded is M and the height of the block to be decoded is N, M and N being a positive integer, the length of the reference samples is 2(M+N)+1. It is worth noting that for a case where the reference samples cannot be used, available reference samples or preset values may be used for padding, so that the length of the reference samples remains at 2(M+N)+1. For example, there is no reference sample for a pixel at an edge of an image, or there is an undecoded reference sample in reference samples corresponding to a block to be decoded and the reference samples cannot be used. In this case, preset values or existing reference samples such as adjacent reference samples having pixel values may be used for padding to form reference weights. FIG. 7 shows a length of reference samples determined according to a width and a height of a block to be decoded. As shown in FIG. 7, the reference samples of the block to be decoded include upper reference samples and left reference samples adjacent to the block to be decoded, the width M of the block to be decoded is 8 pixels, and the height N of the block to be decoded is also 8 pixels. Then it is finally determined that the length of the reference samples is 33 pixels.

In step S602, determine valid reference samples and a valid reference sample length in a length direction of the reference samples according to the intra prediction mode corresponding to the block to be decoded.

In an embodiment of the present disclosure, after the reference samples and the length of the reference samples are determined, the valid reference samples and the valid reference sample length may be determined according to the intra prediction mode corresponding to the block to be decoded. Since the intra prediction modes include an angular mode and a non-angular mode, the methods of determining the valid reference samples and the valid reference samples length may vary.

When the intra prediction mode is the angular mode, a predicted angle may be obtained, and the block to be decoded is projected along the predicted angle in a direction of the reference samples. If the projection point falls on an extension line of the direction of the reference samples, the valid reference samples can be determined by completing the pixels in the direction of the reference samples.

Figure 8A:
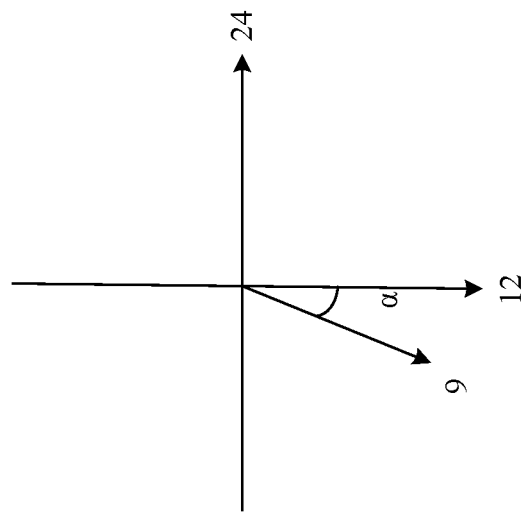
FIG. 8A to FIG. 8B schematically show a schematic flowchart of how to determine valid reference samples and a valid reference sample length when a predicted angle is in a clockwise direction in a diagonal mode according to an embodiment of the present disclosure.
Figure 8A:
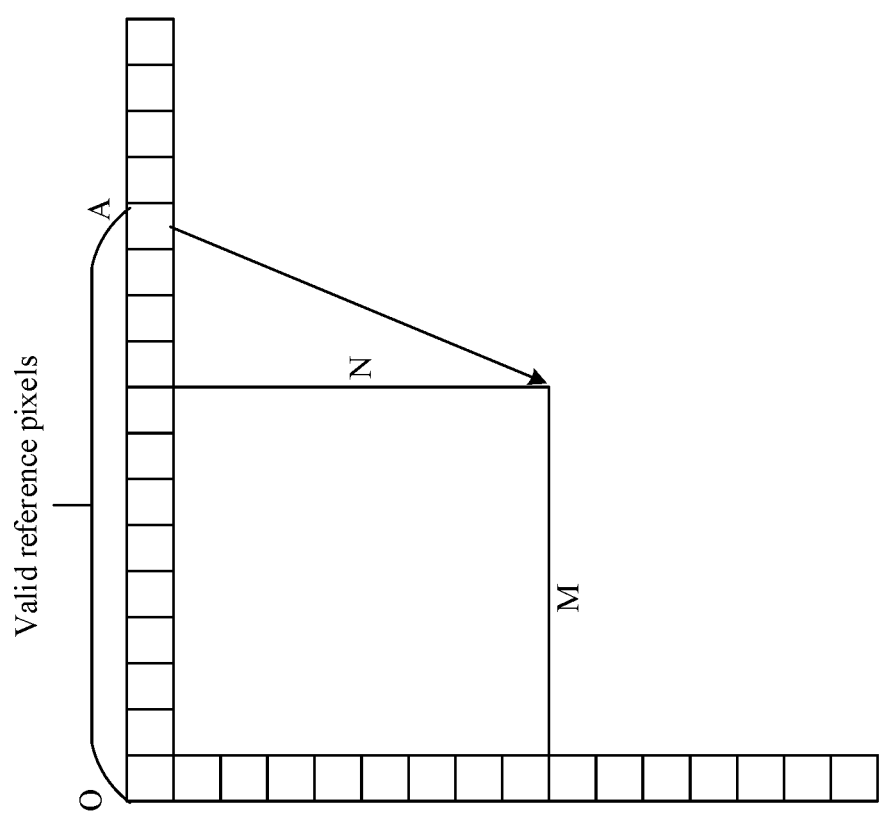
Figure 8B:
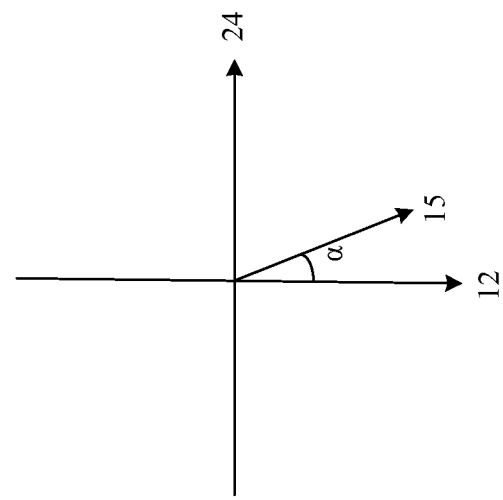
Figure 8B:
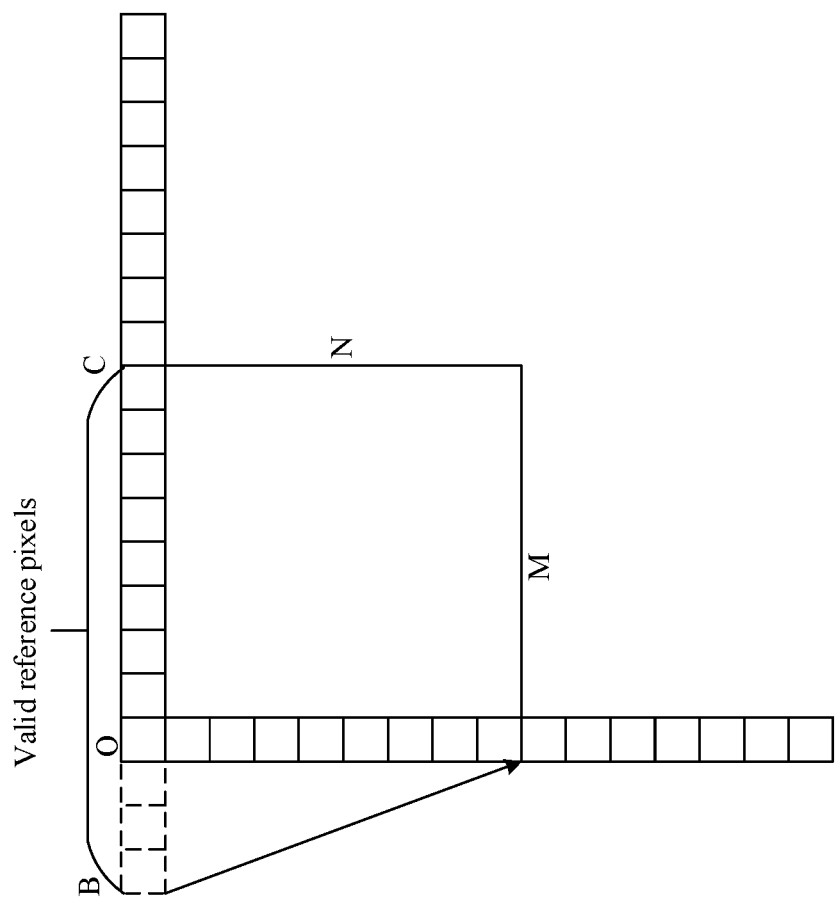

FIG. 8A to FIG. 8B show how to determine valid reference samples and a valid reference sample length when a predicted angle is in a clockwise direction in a diagonal mode. As shown in FIG. 8A, the angular mode is a prediction mode numbered 9. According to the angular mode and the size of the block to be encoded, it may be determined that the projection point falls at point A on the reference sample row, so the valid reference samples corresponding to the block to be encoded are all reference samples between point O and point A on the reference sample row. As shown in FIG. 8B, the angular mode is a prediction mode numbered 15. According to the angular mode and the size of the block to be decoded, it may be determined that the projection point falls at point B on the extension line of the reference sample row, then. In this case, pixels between point O and point B may be completed, and it may be obtained that the valid reference samples corresponding to the block to be decoded are all reference samples between point B and point C on the reference sample row. For the predicted angles in FIG. 8A and FIG. 8B, all the valid reference samples are pixels in the reference sample row, so the calculation the length of the valid reference samples only needs to consider the projection length in the horizontal direction, with a calculation formula being as shown in formula (1):

$$\text{Valid-len} = M + N \times \tan(\alpha) \quad (1),$$

wherein, Valid-len is the length of the valid reference samples, M is the width of the block to be decoded, N is the height of the block to be decoded, and $\alpha$ is the angle between the prediction mode and the vertical direction.

Figure 8C:
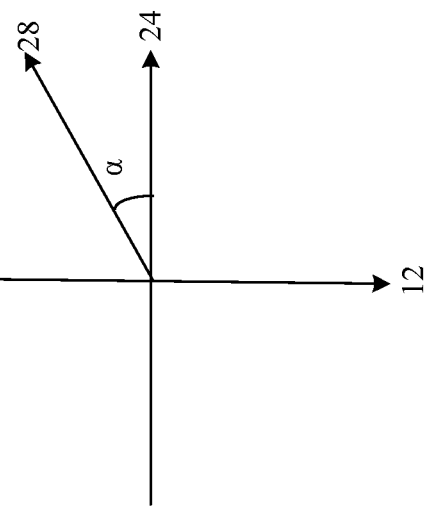
FIG. 8C to FIG. 8D schematically show a schematic flowchart of how to determine valid reference samples and a valid reference sample length when a predicted angle is in a counterclockwise direction in a diagonal mode according to an embodiment of the present disclosure.
Figure 8C:
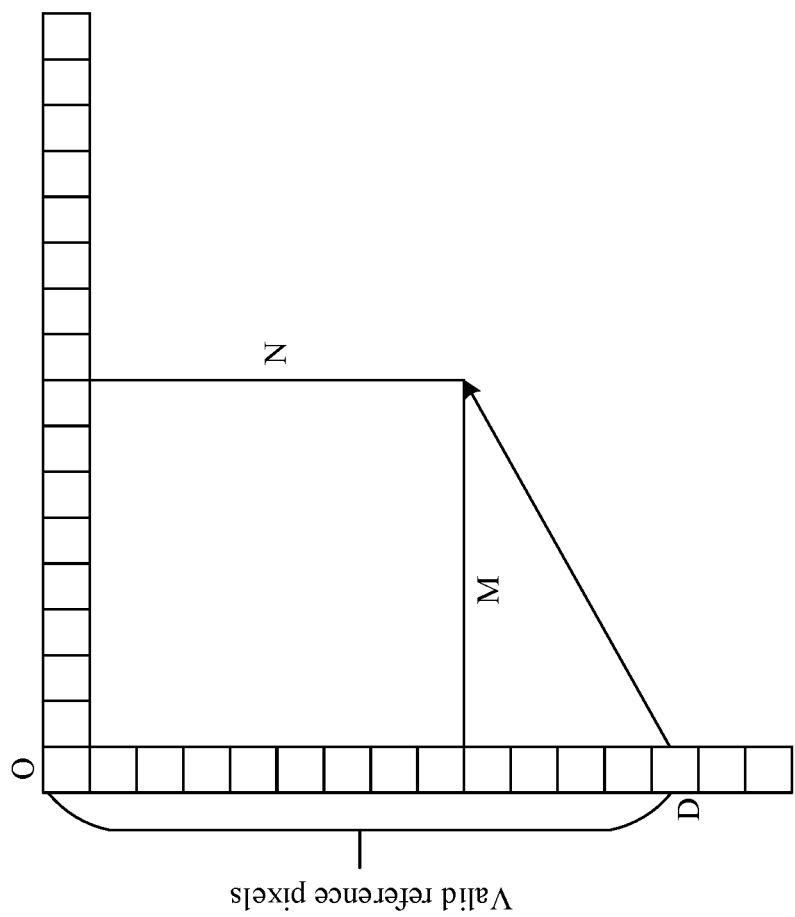
Figure 8D:
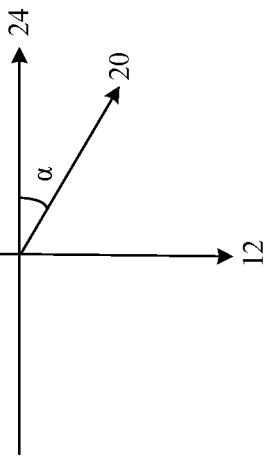
Figure 8D:
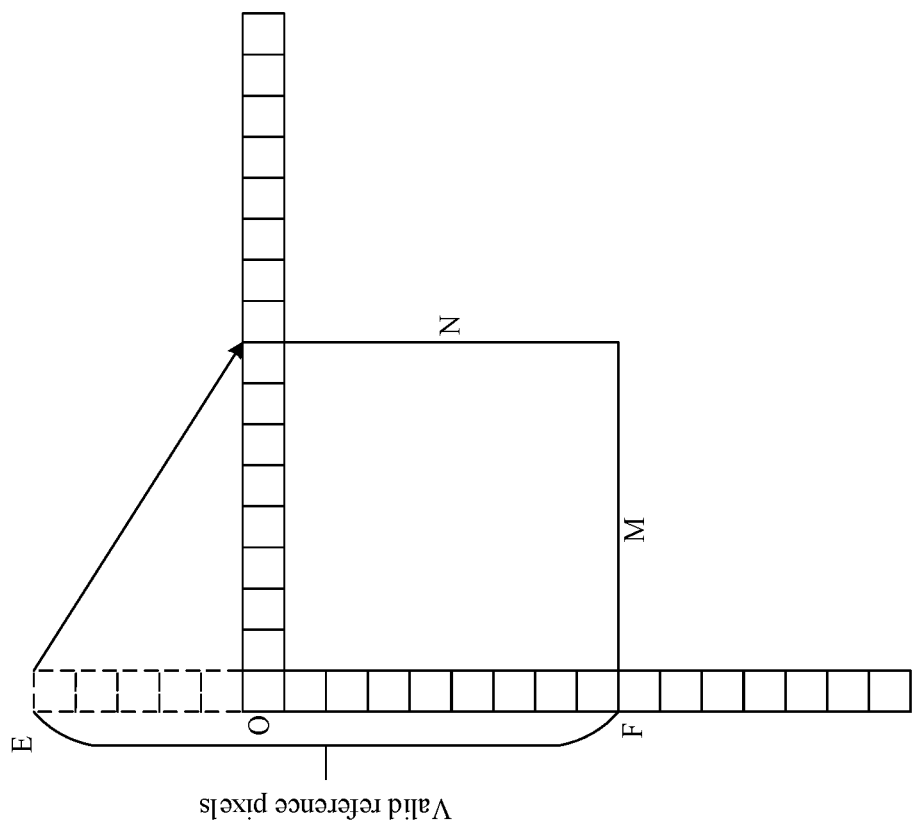

FIG. 8C to FIG. 8D show how to determine valid reference samples and a valid reference sample length when a predicted angle is in a counterclockwise direction in a diagonal mode. As shown in FIG. 8C, the angular mode is a prediction mode numbered 28. According to the angular mode and the size of the block to be encoded, it may be determined that the projection point falls at point D on the reference sample column, so the valid reference samples corresponding to the block to be encoded are all reference samples between point O and point D on the reference sample column. As shown in FIG. 8D, the angular mode is a prediction mode numbered 20. According to the angular mode and the size of the block to be decoded, it may be determined that the projection point falls at point E on the extension line of the reference sample column, then. In this case, pixels between point O and point E may be completed, and it may be obtained that the valid reference samples corresponding to the block to be decoded are all reference samples between point E and point F on the reference sample column. For the predicted angles in FIG. 8C and FIG. 8D, all the valid reference samples are pixels in the reference sample column, so the calculation the length of the valid reference samples only needs to consider the projection length in the vertical direction, with a calculation formula being as shown in formula (2):

$$\text{Valid-len} = N + M \times \tan(\theta) \quad (2),$$

wherein, Valid-len is the length of the valid reference samples, M is the width of the block to be decoded, N is the height of the block to be decoded, and θ is the angle between the prediction mode and the horizontal direction.

When the intra prediction mode is the non-angular mode, the valid reference samples are the reference samples and the valid reference sample length is the length of the reference samples.

In step S603, set one or more preset points in the valid reference samples based on the valid reference sample length, determine a first position in the valid reference samples according to the index values and the preset points, and determine a second position according to a position of a preset reference sample.

In an embodiment of the present disclosure, one or more preset points may be set in the valid reference samples, and different positions of the preset points will result in different weighting lists. The first position may be determined in the valid reference samples according to the index values and the preset points, the second position may be determined according to the position of the preset reference sample, and then different weights may be set for the reference samples according to the relationship between the first position and the second position, to obtain the weighting list corresponding to the block to be decoded. The preset reference sample may be a reference sample obtained by projecting the reference sample according to the predicted angle, or may be a reference sample at any position among the reference samples.

Figure 9:
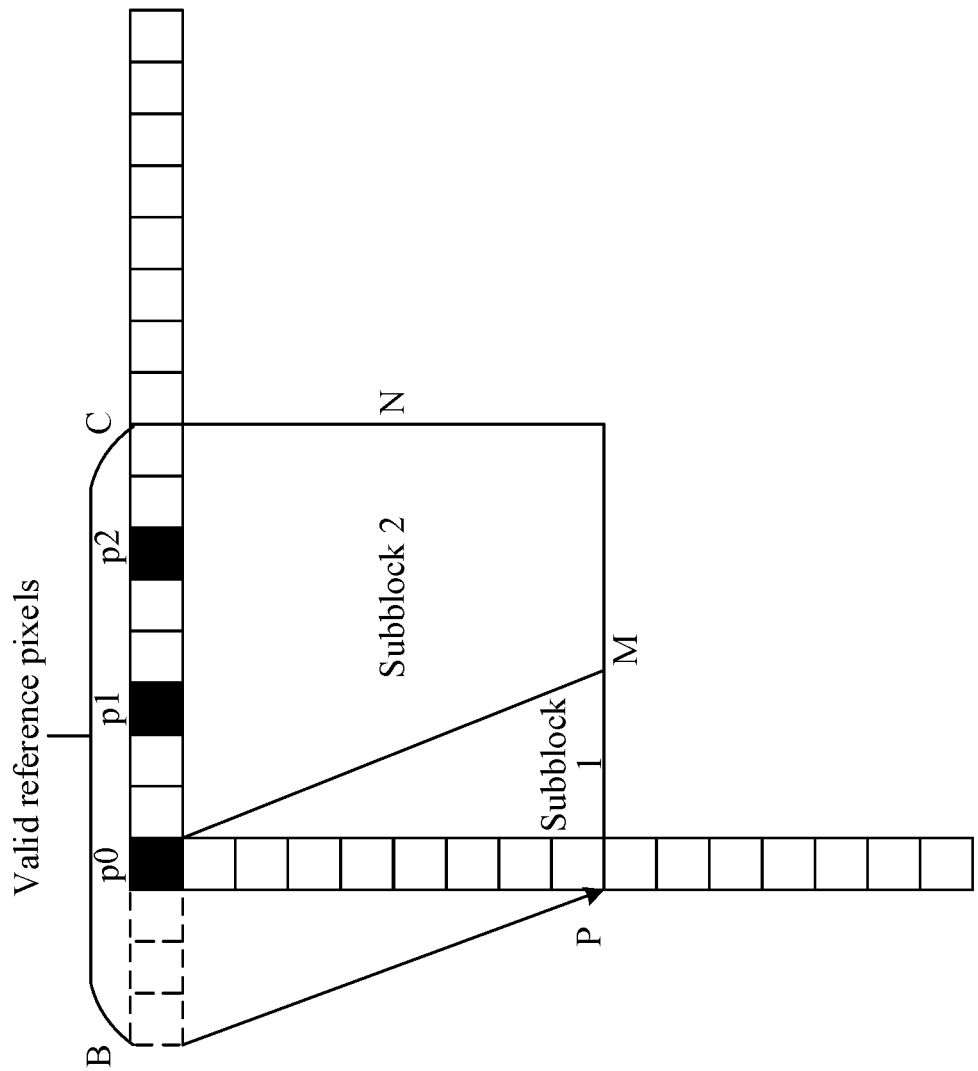
FIG. 9 schematically shows a schematic diagram of positions of preset points according to an embodiment of the present disclosure.

When determining the first position in the valid reference samples according to the index values and the preset points, a plurality of preset points may be sorted in a preset order to form a preset point sequence. Each preset point corresponds to a serial number, and the serial number corresponds to an index value. Therefore, a preset point may be uniquely determined in the preset point sequence according to the index value, and the first position is the position where the preset point is located. As shown in FIG. 9, there are three preset points p0, p1 and p2 among the reference samples in FIG. 9. The three preset points are sequentially numbered from left to right to form a preset point sequence [0, p0], [1, ph], [2, p2]. When the index value is 0, the first position is the position of p0; when the index value is 2, the first position is the position of p2.

The method of determining the second position varies with different types of intra prediction modes. When the intra prediction mode is the angular mode, a position ref_valid_i corresponding to the i-th reference sample ref_i in the direction of the valid reference samples may be determined according to the predicted angle, and ref_valid_i is the second position. Continuing to take FIG. 9 as an example, the reference samples include a reference sample row and a reference sample column. Since the valid reference samples and the reference sample row are in the same row, a projection of a reference sample in the reference sample row on the direction of the valid reference samples according to the predicted angle is still the position of the reference sample. The reference sample column is perpendicular to the direction of the valid reference samples. A pixel in the reference sample column may be projected onto the direction of the valid reference samples according to the predicted angle. For example, reference sample P in FIG. 9 is projected onto pixel B in the direction of the valid reference samples according to the predicted angle, so the position of the valid reference sample B is the second position. When the intra prediction mode is the non-angular mode, the position of the i-th reference sample ref_i is the second position.

In step S604, set weights of the reference samples according to a relationship between the first position and the second position to obtain a weighting list corresponding to the block to be decoded.

Figure 10:
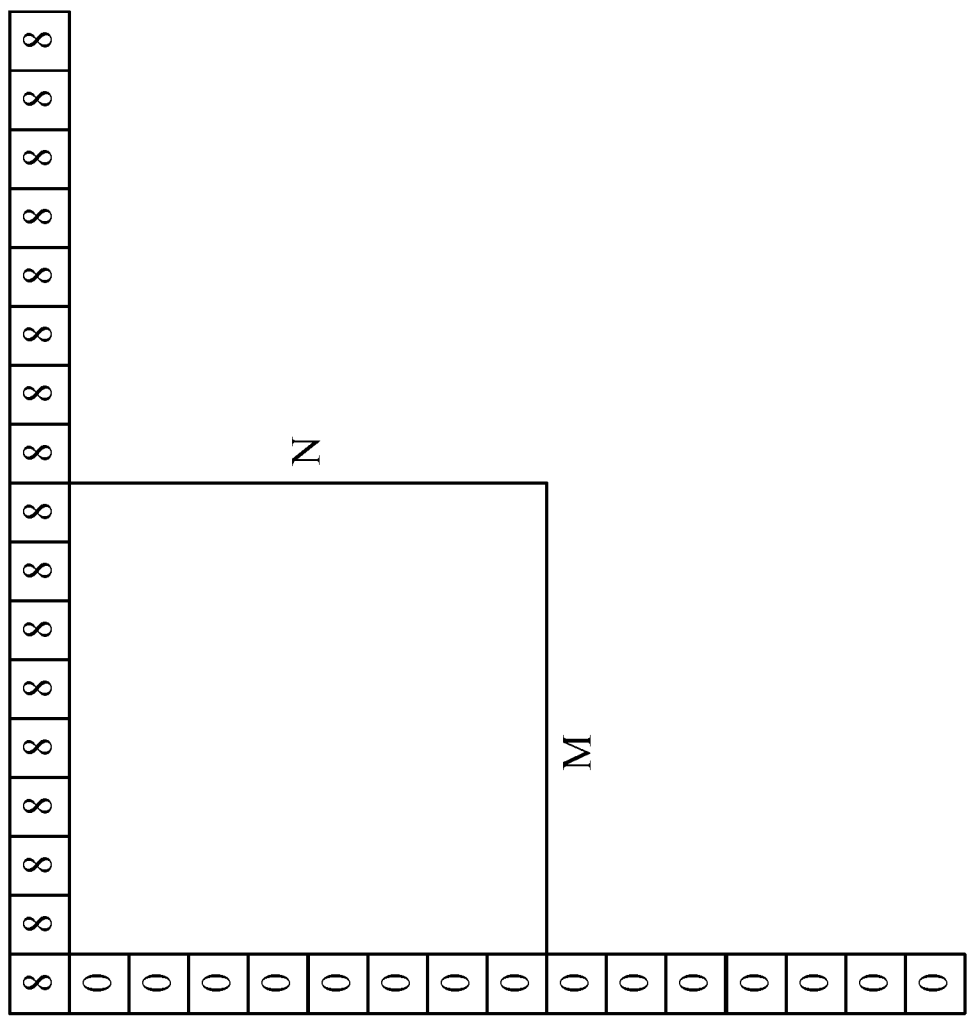
FIG. 10 schematically shows a schematic diagram of reference sample weights according to an embodiment of the present disclosure.

In an embodiment of the present disclosure, after the first position and the second position are determined, the weights of the reference samples may be determined according to a sequence relationship between the first position and the second position. To be specific, weights of the preset reference sample and the reference sample whose position coordinates are less than the coordinates of the first position are set as first weights and weights of the remaining reference samples are set as second weights, in response to coordinates of the first position being less than coordinates of the second position; and the weights of the preset reference sample and the reference sample whose position coordinates are less than the coordinates of the first position are set as the second weights and the weights of the remaining reference samples are set as the first weights, in response to the coordinates of the first position being greater than or equal to the coordinates of the second position. The first weight is different from the second weight. For example, if the second position is before the first position, the weight corresponding to the reference sample ref_i may be set to 0; otherwise, it may be set to 8. This manner is equivalent to dividing the current block into two subblocks, e.g., subblock 1 and subblock 2, and predicted values are derived from different types of reference samples, respectively. It is worth noting that the weights may be set according to actual needs, and are not limited to 0 and 8, but may also be any value in a weight value range. For example, the weight value range may be [0, 8], and the weights may be any value in this range. FIG. 10 shows a schematic diagram of reference sample weights. As shown in FIG. 10, the reference sample weights correspond to the reference samples shown in FIG. 9, where the reference weight row has a weight of 8, and the reference weight column has a weight of 0.

It is worth noting that since the setting of the weights needs to be determined according to the sequence of the first position and the second position, the first position cannot overlap two endpoint pixels of the valid reference samples. In addition, as an embodiment of determining the weights of the reference samples, a transition weight may be added at the first position. The transition weight may be set in various ways. For example, a transition weight of a reference sample located before the first position is any weight in a weight value range, a transition weight of a reference sample located after the first position varies with a distance between a position of the reference sample and the first position, and the transition weight of the reference sample after the first position is greater than a weight of the reference sample before the first position and less than or equal to a maximum weight in the weight value range; or a transition weight of a reference sample located before the first position varies with an absolute distance between a position of the reference sample and the first position, a transition weight of a reference sample located after the first position is any weight in the weight value range, and the transition weight of the reference sample before the first position is greater than a weight of the reference sample after the first position and less than or equal to the maximum weight in the weight value range. For example, still taking the reference weights and predicted angle shown in FIG. 9 as an example, the weight value range is [0, 8], and the first position is the position where p1 is located. In this case, weights of reference samples in the reference sample row before p1 and weights of reference samples in the reference sample column projected to positions before p1 may be set to any value from 0 to 7, and these weights are defined as w1. Weights of reference samples in the reference sample row after p1 (including p1) increase or decrease as the distance between the position of the reference sample and p1 increases, and these weights are defined as w2. For example, w1=2, then w2 may be sequentially 3, 4, 5, 6, 7, 8, 8, 8, 8, 8, 8, 8 or may be 8, 8, 8, 8, 8, 8, 8, 7, 6, 5, 4, 3 from left to right. Corresponding, the weights of the reference samples in the reference sample row before p1 and the weights of the reference samples in the reference sample column projected to positions before p1 may be set to increase or decrease as the absolute distance between the position of the reference sample and p1 increases, and these weights are defined as w1. The weights of the reference samples in the reference sample row after p1 (including p1) are any value from 0 to 7, and these weights are defined as w2. For example, w2=0, then w1 may be sequentially 1, 2, 3, 4, 5, 6, 7, 8, 8, 8, 8, 8, 8, 8, 8, 8, 8, 8, 8 from left to right, where the first 16 bits correspond to the reference samples in the reference sample column projected along the prediction angle onto the direction of the valid reference samples, and the last three bits correspond to the three reference samples in the reference sample row before p1. In addition, the weights of the reference samples may also be set according to other criteria. For example, the weight increases by 1 each time the distance increases by 2. For example, the weights of the reference samples before the first position are 0, and the weights of the reference samples after the first position are 1122334455667788. Alternatively, the increase of the weight is not incremental, but the weight increases irregularly with the increase of the distance. For example, the weights of the reference samples before the first position are 2, and the weights of the reference samples after the first position are 456666777888. Alternatively, the weights of the reference samples before and after the first position change with the distance to the first position, but the value ranges of the weights on two sides are different. For example, the weights of the reference samples before the first position are in a range of [0, 4], the weights of the reference samples after the first position are in a range of [5, 8], and so on. The setting of the weights of the reference samples in the embodiments of the present disclosure includes all possible weight setting variants, and the details will not be repeated here.

In step S330, determine reference samples of a first category and reference samples of a second category according to reference samples corresponding to the current block, and weight the reference samples of the first category and the reference samples of the second category based on the target weighting list to obtain weighted reference samples.

In some embodiments, in step S320, the block to be decoded is divided into different subblocks by setting different weights for the reference samples, and each subblock corresponds to a different weight of the reference samples. To obtain a more accurate predicted value of the block to be decoded, different types of reference samples may be weighted based on the weighting list corresponding to the reference samples, and then the block to be decoded may be predicted based on the weighted reference samples. The different types of reference samples are determined based on the reference samples corresponding to the block to be decoded. In an embodiment of the present disclosure, the different types of reference samples include reference samples of a first category and reference samples of a second category. In obtaining the reference samples of the first category and the reference samples of the second category, first, auxiliary reference samples of a same size are built according to the reference samples, and target processing is performed on pixel values of the reference samples to obtain pixel values of pixels among the auxiliary reference samples; and finally, the reference samples and the auxiliary reference samples are classified according to a preset rule to obtain the reference samples of the first category and the reference samples of the second category. Specifically, the reference samples corresponding to the block to be decoded may be defined as R_org, and the auxiliary reference samples derived from the target processing on R_org may be defined as R_tmp. There are various methods for deriving R_tmp by processing R_org, for example: (i) averaging all pixel values in R_org using the DC mode, and using the average as the pixel value for each pixel in R_tmp; (ii) obtaining the pixels corresponding to a reference sample weight greater than or equal to (or less than or equal to) a preset threshold in R_org, averaging these pixels using the DC mode, and using the average as the pixel value of each pixel in R_tmp; (iii) using a filter to filter R_org to obtain R_tmp, and remove outliers in R_org, to make the values in R_tmp smoother; (iv) deriving pixels in R-tmp from reconstructed pixels farther from the current block, for example, deriving R_tmp from reconstructed pixels which are three rows away from the current block according to the predicted angle. Of course, R_tmp may also be derived according to other methods, for example, using the valid reference samples corresponding to the current block as R_org and determining R_tmp according to R_org, which will not be detailed in the embodiments of this application.

Figure 11:
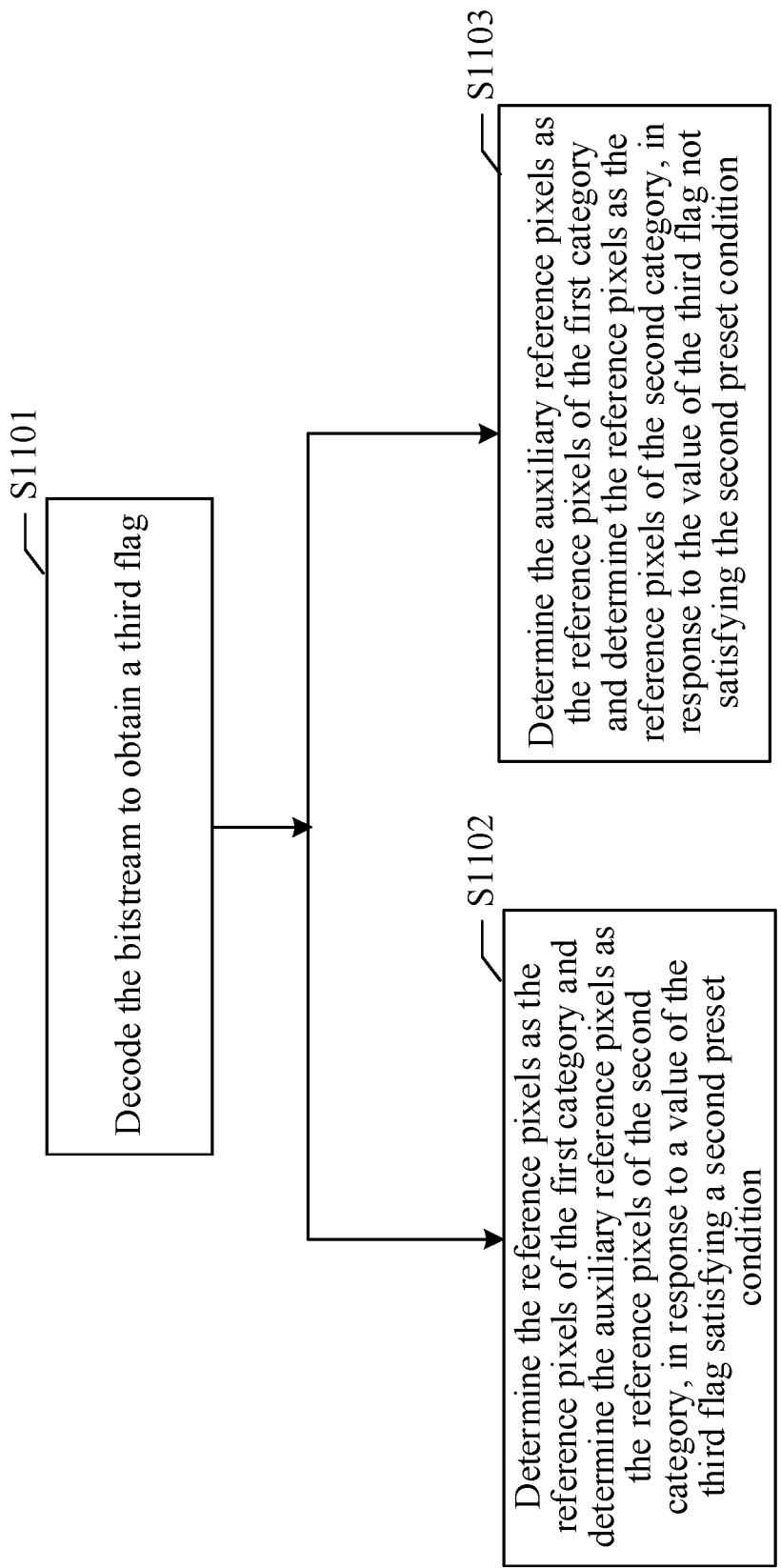
FIG. 11 schematically shows a schematic flowchart of determining reference samples of a first category and reference samples of a second category according to a third flag according to an embodiment of the present disclosure.

After R_org and R_tmp are determined, R_org and R_tmp may be classified according to a preset rule to obtain reference samples of the first category and reference samples of the second type. Specifically, the preset rule may be to directly determine the reference samples R_org as the reference samples of the first category and determine the auxiliary reference samples R-tmp as the reference samples of the second category. Alternatively, the reference samples of the first category and the reference samples of the second type may also be determined according to the third flag. FIG. 11 shows a schematic flowchart of determining reference samples of a first category and reference samples of a second category according to a third flag. As shown in FIG. 11, in step S1101, decode the bitstream to obtain a third flag. In step S1102, determine the reference samples as the reference samples of the first category and determine the auxiliary reference samples as the reference samples of the second category, in response to a value of the third flag satisfying a second preset condition. In step S1103, determine the auxiliary reference samples as the reference samples of the first category and determine the reference samples as the reference samples of the second category, in response to the value of the third flag not satisfying the second preset condition. The second preset condition may specifically be that the value of the third flag is 1. That is, when the value of the third flag is 1, R_org is the reference samples of the first category, and R_tmp is the reference samples of the second category; when the value of the third flag is not 1, R_tmp is the reference samples of the first category, and R-org is the reference samples of the second type.

After the reference samples of the first category and the reference samples of the second type are determined, the reference samples of the first category and the reference samples of the second type may be weighted according to the weighting list corresponding to the reference samples to obtain the weighted reference samples. A formula for calculating the weighted reference sample is shown in formula (3):

$$R[x][y]=(R_0[x][y] \times R_W[x][y]+R_1[x][y] \times (\max\_w - R_W[x][y]))/\max\_w \quad (3),$$

wherein R[x][y] represents a weighted reference sample at coordinates (x, y), $R_0$[x][y] represents a reference sample of the first category at the coordinates (x, y), $R_W$[x][y] represents a weight corresponding to the reference sample at the coordinates (x, y) in the target weighting list, $R_1$[x][y] represents a reference sample of the second category at the coordinates (x, y), and max_w represents a maximum value in the weight value range.

The weighted reference samples may be obtained according to the above calculation formula, and then the current block may be predicted according to the weighted reference samples.

In the embodiments of the present disclosure, luminance and chrominance are important parameters of a video image. Correspondingly, when the video is encoded and compressed, the luminance and chrominance of the video image will be changed. Therefore, in order to restore the video image at the decoding stage, it is necessary to predict the luminance and chrominance of the block to be decoded to obtain a reconstructed image. In the above embodiments, the reference samples corresponding to the block to be decoded may include luminance reference samples and chrominance reference samples. According to the above embodiments, a luminance reference sample weighting list and a chrominance reference sample weighting list corresponding to the current block may be determined, and then weighted luminance reference samples and weighted chrominance reference samples may be determined according to the luminance reference sample weighting list, the chrominance reference sample weighting list and the luminance reference samples and the chrominance reference samples corresponding to the current block. The current block is predicted according to the weighted chrominance reference samples and the weighted chrominance reference samples respectively, and the current block is reconstructed according to predicted chrominance values and predicted chrominance values. In addition, the reference samples in the above embodiments may be luminance reference samples. After a weighting list of the luminance reference samples is obtained, the weights of the chrominance reference samples may be calculated according to the weights of the luminance reference samples to obtain a weighting list of the chrominance reference samples. A calculation formula for calculating the weights of the chrominance reference samples according to the weights of the luminance reference samples is shown in formula (4):

$$R_{W\_}\text{Chorma}[x][y]=R_{W\_}\text{Luma}[x<<\text{scale}\_x][y<<\text{scale}\_y] \quad (4),$$

wherein, $R_{W\_}$Chorma[x][y] represents a weight of a chrominance reference sample at coordinates (x, y), $R_{W\_}$Luma represents a weighting list corresponding to the luminance reference samples, and scale_x represents a size scaling factor of a luminance component and a chrominance component of a video image in an x direction, scale_y represents a size scaling factor of the luminance component and the chrominance component of the video image in a y direction, << represents a left shift operator, and the value of x<<1 is equal to the value of x*2.

For example, an input image is in YcbCr420 format, one luminance reference sample corresponds to four chrominance reference samples, scale_x and scale_y are set to 1, a weight matrix of the luminance reference samples is defined as $R_{W\_}$Luma, the weights of the chrominance reference samples are defined as $R_{W\_}$Chorma, and a chrominance weight at coordinates (x, y) is $R_{W\_}$Chorma[x][y]=$R_{W\_}$Luma[x<<1][y<<1].

After the weighting list of the chrominance reference samples is determined, chrominance reference samples of the first category and chrominance reference samples of the second category may be determined according to chrominance reference samples corresponding to the block to be decoded, and the chrominance reference samples of the first category and the chrominance reference samples of the second category may be weighted based on the weighting list of the chrominance reference samples to obtain weighted chrominance reference samples. The calculation formula corresponding to the weighting processing is the same as formula (2), so the details will not be repeated here.

In step S340, predict the current block according to the weighted reference samples and the target intra prediction mode to obtain a predicted block corresponding to the current block.

In some embodiments, after the weighted reference samples corresponding to the current block is determined, the current block may be predicted according to the weighted reference samples and the target intra prediction mode to obtain the predicted block corresponding to the current block, and then a reconstructed image may be obtained according to the predicted blocks corresponding to multiple blocks to be decoded corresponding to the video image.

In some embodiments, after the prediction of the current block is completed, the intra prediction mode corresponding to the current block may be stored for predicting an intra prediction mode of a subsequent block to be decoded. The intra prediction mode of the current block may be stored in various ways. For example, an intra weighted prediction mode corresponding to the current block may be stored as the final intra prediction mode, or the intra prediction mode may be stored respectively according to an intra prediction mode corresponding to a smallest partition unit in the current block. Next, how to store the intra prediction mode corresponding to the smallest partition unit in the current block is described in detail.

According to the analysis of the above embodiments, it can be seen that the reference samples of the first category and the reference samples of the second type are determined according to different manners, the block to be decoded is predicted according to the weighted reference samples and the target intra prediction mode, and the weighted reference samples are determined according to the reference samples of the first category, the reference samples of the second category, and the weights of the reference samples. Therefore, during prediction, some pixels in the block to be decoded are predicted according to the intra prediction mode corresponding to the reference samples of the first category to derive predicted values, some pixels are predicted according to the intra prediction mode corresponding to the reference samples of the second category to derive predicted values. That is to say, the intra weighted prediction mode includes two prediction modes, so it is necessary to determine which intra prediction mode is to be used for prediction. By storing the intra prediction modes corresponding to the smallest partition units in the decoding block, the precision of the prediction mode can be improved, thereby improving the prediction accuracy.

Figure 12:
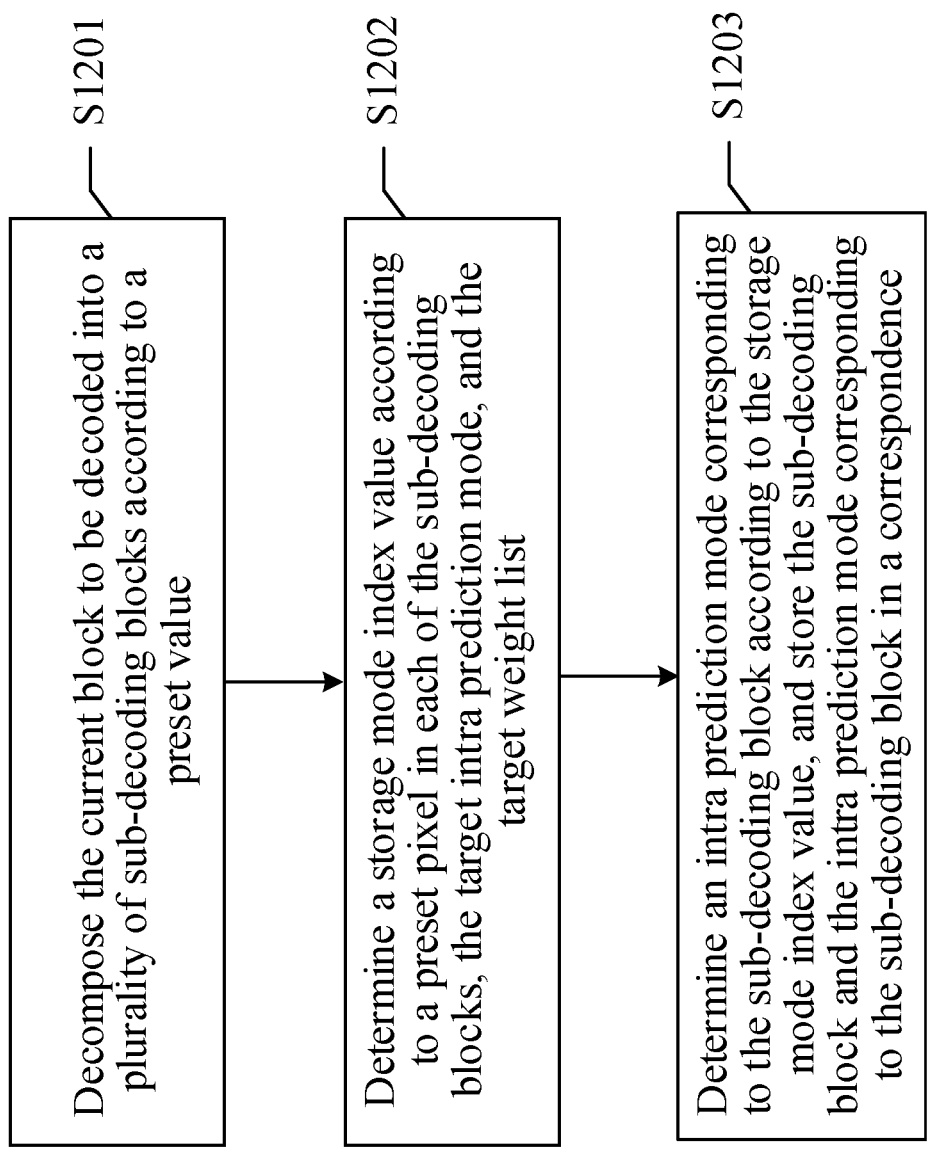
FIG. 12 schematically shows a schematic flowchart of storing an intra prediction mode according to a smallest partition unit according to an embodiment of the present disclosure.

FIG. 12 shows a schematic flowchart of storing an intra prediction mode according to a smallest partition unit. As shown in FIG. 12, in step S1201, decompose the current block into a plurality of sub-decoding blocks according to a preset value. In step S1202, determine a storage mode index value according to a preset pixel in each of the sub-decoding blocks, the target intra prediction mode, and the target weighting list. In step S1203, determine an intra prediction mode corresponding to the sub-decoding block according to the storage mode index value, and store the sub-decoding block and the intra prediction mode corresponding to the sub-decoding block in a correspondence.

In step S1201, the preset value may be a size corresponding to the smallest partition unit, such as 4×4, etc. In step S1202, the preset pixel in the sub-decoding block may specifically be a pixel located at the upper left corner of the smallest partition unit, a pixel located at other corners of the smallest partition unit, or a pixel located at the center point of the smallest partition unit, and of course may also be a pixel at other positions in the smallest division unit. The target intra prediction mode includes an angular mode and a non-angular mode. The method for determining the storage mode index value varies with different target intra prediction modes.

In response to the target intra prediction mode being an angular mode, first the preset pixel is projected in a direction of the valid reference samples according to a predicted angle in the angular prediction mode to obtain a target reference sample; then, a weight corresponding to the target reference sample in the target weighting list is obtained, and the storage mode index value is marked as a first value in response to the weight corresponding to the target reference sample being greater than or equal to a first preset threshold; the storage mode index value is marked as a second value different from the first value, in response to the weight corresponding to the target reference sample being less than the first preset threshold.

In response to the target intra prediction mode being not the angular mode, reference samples corresponding to the sub-decoding blocks are classified according to the target weighting list and a second preset threshold to obtain a first number of reference samples whose weights are less than the second preset threshold and a second number of reference samples whose weights are greater than or equal to the second preset threshold among the reference samples corresponding to the sub-decoding blocks; the storage mode index value is marked as the first value in response to the first number being less than or equal to the second number; and the storage mode index value is marked as the second value in response to the first number being greater than the second number.

The first preset threshold and the second preset threshold may be set according to actual needs. As an example, the first preset threshold and the second preset threshold may be the same or different. In addition, the first value may be 0, and the second value may be 1. Of course, the first value and the second value may also be set to other values, which is not particularly limited in the embodiments of the present disclosure.

As an example, the first value and the second value correspond to different intra prediction modes. When it is determined that the storage mode index value is the first value, the intra prediction mode corresponding to the reference samples of the first category is stored as the prediction mode corresponding to the smallest partition unit. When it is determined that the storage mode index value is the second value, the intra prediction mode corresponding to the reference samples of the second category is stored as the prediction mode corresponding to the smallest partition unit. For example, assuming that the intra prediction mode corresponding to the reference samples of the first category is the angular mode and the intra prediction mode corresponding to the reference samples of the second category is the DC mode, the intra prediction mode corresponding to the smallest partition unit is determined as the angular mode when the storage mode index value is 0, and the intra prediction mode corresponding to the smallest partition unit is determined as the DC mode when the storage mode index value is 1.

Figure 13:
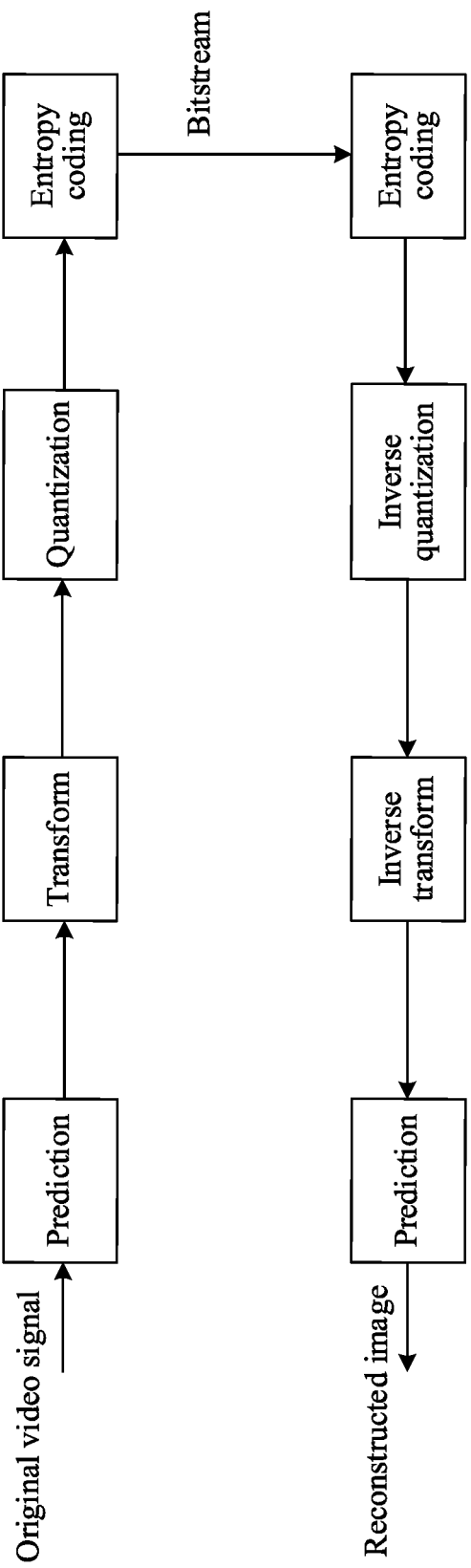
FIG. 13 schematically shows a schematic flowchart of video encoding and decoding.

The above embodiments describe, from the perspective of the decoder side, how the decoder predicts the block to be decoded to obtain the corresponding predicted block and then obtains a reconstructed image. The operations performed by the decoder side may all be regarded as inverse to the operations performed by the encoder side. As shown in FIG. 13, a main process used by the encoder to encode and compress an original video signal is: prediction-transform-quantization-entropy coding, to form a bitstream. Correspondingly, a main process used by the decoder side to decode the bitstream is: entropy coding-reverse quantization-inverse transform-prediction. Therefore, the method for prediction based on the intra weighted prediction mode adopted in the embodiments of the present disclosure is also applicable to the encoder side.

Figure 14:
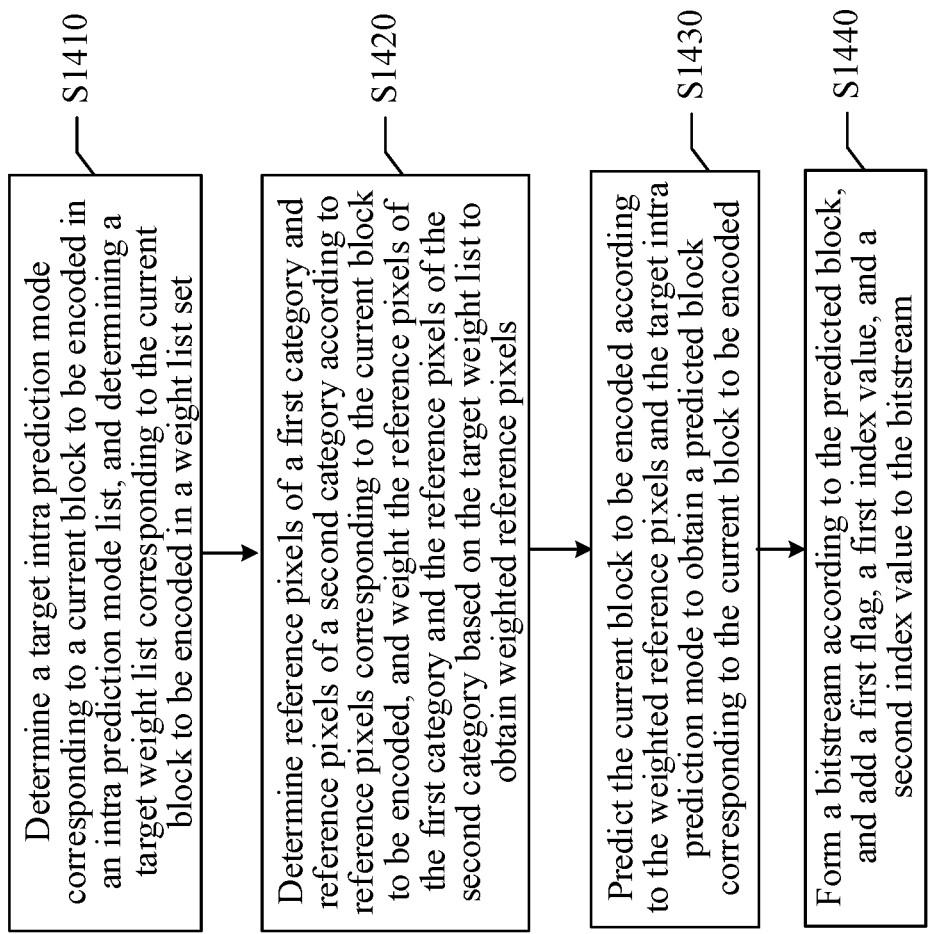
FIG. 14 schematically shows a schematic flowchart of a video encoding method according to an embodiment of the present disclosure.

FIG. 14 schematically shows a flowchart of a video encoding method according to an embodiment of the present disclosure. The video encoding method may be performed by an encoder, which may be the encoder 102 shown in FIG. 1. Referring to FIG. 14, the video encoding method at least includes steps S1410 to S1440, which are described in detail as follows:

In step S1410, determine a target intra prediction mode corresponding to a current block in an intra prediction mode list, and determine a target weighting list corresponding to the current block in a weighting list set.

In an embodiment of the present disclosure, after an original video signal is obtained, each video image may be divided into blocks. The video images are divided into multiple non-overlapping processing units (blocks to be encoded), and then an encoder is used to perform an encoding operation on each processing unit. When performing an encoding operation on a processing unit, the encoder first performs predictive coding on the processing unit. The predictive coding mode may be an intra prediction mode or an inter prediction mode selected according to different needs. In an embodiment of the present disclosure, the predictive coding mode is the intra prediction mode.

In an embodiment of the present disclosure, for different processing units, an optimal intra prediction mode may be selected from multiple intra prediction modes to predict the processing units. The multiple intra prediction modes may be one or more of an intra prediction mode, a preset angular mode, a bilinear mode, or a plane mode corresponding to an encoded block adjacent or non-adjacent to the current block. The optimal intra prediction mode corresponding to each processing unit may be determined by trying a plurality of intra prediction modes and comparing a rate distortion of each intra prediction mode.

In an embodiment of the present disclosure, a target weighting list corresponding to the current block may further be determined from the weighting list set, where the target weighting list is used for subsequently performing weighting processing on reference samples of different types corresponding to the current block. In an embodiment of the present disclosure, the weighting list set includes a plurality of weighting lists and serial numbers corresponding to the weighting lists, and the serial numbers corresponding to the weighting lists are generated based on index values, intra prediction modes, and a width and a height of the block to be encoded. After the width and height and the intra prediction mode of the current block are determined, an identifier may be determined according to a preset index value, the width and height of the current block to be coded, and the intra prediction mode, and then the target weighting list corresponding to the current block may be determined by matching the identifier against the serial numbers in the weighting list set.

Each weighting list in the weighting list set may be derived according to the valid reference samples corresponding to the block to be encoded. Specifically, First, a length of the reference samples corresponding to the block to be encoded may be determined according to the width and the height of the block to be encoded. Then, valid reference samples and a valid reference sample length are determined in a length direction of the reference samples according to the intra prediction mode corresponding to the block to be encoded. Next, one or more preset points are set in the valid reference samples based on the valid reference sample length. A first position in the valid reference samples is determined according to the index values and the preset points, and a second position is determined according to a position of a preset reference sample. Finally, weights of the reference samples are set according to a relationship between the first position and the second position to obtain a weighting list corresponding to the block to be encoded. Implementations of the above steps are the same as the manner of deriving the weighting list at the decoder side, so the details will not be repeated here. It is worth noting that the weighting list set may also be generated according to other methods. For example, when the width and height of the block to be coded are very small and there is only one preset point, the serial number corresponding to the reference sample weighting list of the block to be coded may be determined according to only the width and height of the block to be coded and the corresponding intra prediction mode. Certainly, this may also be implemented in another manner, and details are not described in this embodiment of the present invention.

In step S1420, determine reference samples of a first category and reference samples of a second category according to reference samples corresponding to the current block, and weight the reference samples of the first category and the reference samples of the second category based on the target weighting list to obtain weighted reference samples.

In an embodiment of the present disclosure, the block to be encoded is divided into different subblocks by setting different weights for the reference samples, and each subblock corresponds to a different weight of the reference samples. To obtain a more accurate predicted value of the block to be encoded, different types of reference samples may be weighted based on the weighting list corresponding to the reference samples, and then the block to be encoded may be predicted based on the weighted reference samples. In an embodiment of the present disclosure, the reference samples of the first category and the reference samples of the second category may be determined according to the reference samples corresponding to the current block. The method for determining the reference samples of the first category and the reference samples of the second category is similar to that used at the decoder side. First, auxiliary reference samples of a same size may be built according to the reference samples corresponding to the current block. Then, target processing is performed on pixel values of the reference samples to obtain pixel values of pixels among the auxiliary reference samples. Finally, the reference samples and the auxiliary reference samples are classified according to a preset rule to obtain the reference samples of the first category and the reference samples of the second category. Specifically, the reference samples corresponding to the current block may be defined as R_org, and the auxiliary reference samples derived from the target processing on R_org may be defined as R_tmp. The target processing may be: averaging all pixel values in R_org using the DC mode, and using the average as the pixel value for each pixel in R_tmp; obtaining the pixels corresponding to a reference sample weight greater than or equal to (or less than or equal to) a preset threshold in R_org, averaging these pixels using the DC mode, and using the average as the pixel value of each pixel in R_tmp; using a filter to filter R_org to obtain R_tmp, and remove outliers in R_org, to make the values in R_tmp smoother; or deriving pixels in R-tmp from reconstructed pixels farther from the current block, for example, deriving R_tmp from reconstructed pixels which are three rows away from the current block according to the predicted angle. Of course, R_tmp may also be derived according to other methods, for example, using the valid reference samples corresponding to the current block as R_org and determining R_tmp according to R_org, which will not be detailed in the embodiments of this application.

In an embodiment of the present disclosure, after the reference samples and the auxiliary reference samples corresponding to the current block are determined, the reference samples of the first category and the reference samples of the second category may be determined according to a preset rule. For example, the reference samples corresponding to the current block are determined as the reference samples of the first category, and the auxiliary reference samples corresponding to the current block are determined as the reference samples of the second category. Of course, the reference samples corresponding to the current block may be determined as the reference samples of the second category, and the auxiliary reference samples corresponding to the current block may be determined as the reference samples of the first category.

Next, the reference samples of the first category and the reference samples of the second category may be weighted according to the target weighting list corresponding to the current block to obtain weighted reference samples, with a calculation formula being shown in formula (3):

$$R[x][y]=(R_0[x][y] \times R_W[x][y]+R_1[x][y] \times (\max\_w - R_W[x][y]))/\max\_w \quad (3),$$

wherein $R[x][y]$ represents a weighted reference sample at coordinates (x, y), $R_0[x][y]$ represents a reference sample of the first category at the coordinates (x, y), $R_W[x][y]$ represents a weight corresponding to the reference sample at the coordinates (x, y) in the target weighting list, $R_1[x][y]$ represents a reference sample of the second category at the coordinates (x, y), and max_w represents a maximum value in the weight value range.

In an embodiment of the present disclosure, luminance and chrominance are features of different channels of the video image. During coding, luminance information and chrominance information of the video image are also encoded respectively. Therefore, in the above embodiments, the reference samples corresponding to the current block include luminance reference samples and chrominance reference samples. According to the methods in the above embodiments, a luminance reference sample weighting list and a chrominance reference sample weighting list corresponding to the current block may be obtained respectively, and then weighted luminance reference samples and weighted chrominance reference samples may be determined according to the luminance reference sample weighting list, the chrominance reference sample weighting list and the luminance reference samples and the chrominance reference samples corresponding to the current block. The current block is predicted according to the weighted chrominance reference samples and the weighted chrominance reference samples respectively, and the current block is encoded according to predicted chrominance values and predicted chrominance values. In addition, the reference samples corresponding to the current block in the above embodiments may be luminance reference samples. After a weighting list of the luminance reference samples is obtained, the weights of the chrominance reference samples may be calculated according to the weights of the luminance reference samples to obtain a weighting list of the chrominance reference samples. A calculation formula for calculating the weights of the chrominance reference samples according to the weights of the luminance reference samples is shown in formula (4):

$$R_{W\_}Chorma[x][y]=R_{W\_}Luma[x<<scale\_x][y<<scale\_y] \quad (4),$$

wherein, $R_{W\_}Chorma[x][y]$ represents a weight of a chrominance reference sample at coordinates (x, y), $R_{W\_}Luma$ represents a weighting list corresponding to the luminance reference samples, and scale_x represents a size scaling factor of a luminance component and a chrominance component of a video image in an x direction, scale_y represents a size scaling factor of the luminance component and the chrominance component of the video image in a y direction, << represents a left shift operator, and the value of x<<1 is equal to the value of x*2.

After the weighting list of the chrominance reference samples is determined, chrominance reference samples of the first category and chrominance reference samples of the second category may be determined according to chrominance reference samples corresponding to the block to be encoded, and the chrominance reference samples of the first category and the chrominance reference samples of the second category may be weighted based on the weighting list of the chrominance reference samples to obtain weighted chrominance reference samples. The calculation formula corresponding to the weighting processing is the same as formula (3), so the details will not be repeated here.

In step S1430, predict the current block according to the weighted reference samples and the target intra prediction mode to obtain a predicted block corresponding to the current block.

In an embodiment of the present disclosure, after the weighted reference samples corresponding to the current block to be coded are determined, the current block may be predicted according to the weighted reference samples and the target intra prediction mode corresponding to the current block, to obtain a predicted block corresponding to the current block.

In some embodiments, after the prediction of the current block is completed, the intra prediction mode corresponding to the current block may be stored for predicting an intra prediction mode of a subsequent block to be encoded. The intra prediction mode of the current block may be stored in various ways. For example, an intra weighted prediction mode corresponding to the current block may be stored as the final intra prediction mode, or the intra prediction mode may be stored respectively according to an intra prediction mode corresponding to a smallest partition unit in the current block. The method for storing the intra prediction mode of the current block is similar to the method of storing the intra prediction mode of the current block in the above embodiments, except that the two methods are for different objects and different application scenarios. That is, one of the methods is for the block to be encoded and for the encoding process, while the other method is for the block to be decoded and for the decoding process.

In step S1440, form a bitstream according to the predicted block, and add a first flag, a first index value, and a second index value to the bitstream.

As an example, the first flag is used for identifying whether to use an intra weighted prediction mode for a block to be decoded; the first index value is used for determining a target intra prediction mode corresponding to the block to be decoded in a first intra prediction mode list, and the second index value is used for determining a target weighting list corresponding to the block to be decoded in the weighting list set.

In an embodiment of the present disclosure, according to the flowchart shown in FIG. 13, it may be seen that the encoder encodes and compresses the original video signal to form a bitstream, and then the decoder side decodes the bitstream to form a reconstructed image. Therefore, the encoder side, after completing the prediction of all processing units, further needs to perform transform and quantization and entropy coding on the predicted block corresponding to the block to be encoded to form a bitstream, and needs to add some identification information to the bitstream, so that the decoder side can obtain a specific processing manner used by the encoder side according to the identification information, and apply the specific processing manner to the decoding process.

As an example, the identification information may include a first flag, a first index value, and a second index value, where the first flag is used for identifying whether to use an intra weighted prediction mode for a current block, the first index value is used for determining a target intra prediction mode corresponding to the block to be encoded in a first intra prediction mode list, and the second index value is used for determining a target weighting list corresponding to the block to be decoded in the weighting list set.

As an example, the identification information may further include a second flag, a third flag, and a third index value, where the second flag is used for identifying whether the target intra prediction mode is in the first intra prediction mode list, the third flag is used for identifying how to determine the reference samples of the first category and the reference samples of the second type, and the third index value is used for identifying whether the target intra prediction mode is in the first intra prediction mode list.

In the video encoding and decoding methods in the embodiments of the present disclosure, at the decoder side, a bitstream is first decoded to obtain a first flag; it is determined according to the first flag whether to use an intra weighted prediction mode; after determining to use the intra weighted prediction mode, a target intra prediction mode is determined in a first intra prediction mode list according to a first index value obtained by decoding the bitstream; a target weighting list is determined in a weighting list set according to the second index value; then, reference samples of a first category and reference samples of a second category are determined according to reference samples corresponding to the current block, and the reference samples of the first category and the reference samples of the second category are weighted based on the target weighting list to obtain weighted reference samples; finally, the block to be decoded is predicted according to the weighted reference samples and the target intra prediction mode to obtain a predicted block corresponding to the block to be decoded. On the encoder side, a prediction method similar to that used at the decoder side is used to perform predictive coding on the block to be encoded to generate a bitstream, and the bitstream is transmitted to a decoder for decoding. On the one hand, the technical solutions of the present disclosure can perform weighted combination of two types of intra prediction reference samples, and derive a predicted value based on the weighted-combined reference samples, thereby improving the accuracy of the predicted value. On the other hand, when there are multiple textures in a coding block/decoding block, an accurate predicted value can be obtained. Furthermore, the prediction method in the present disclosure can be applied to video encoding and decoding, thereby improving the encoding and decoding efficiency.

The following describes apparatus embodiments of this application, and the apparatus embodiments may be used for performing the video decoding method in the foregoing embodiment of this application. For details not disclosed in the apparatus embodiments of this application, reference is made to the embodiments of the foregoing video decoding method in this application.

Figure 15:
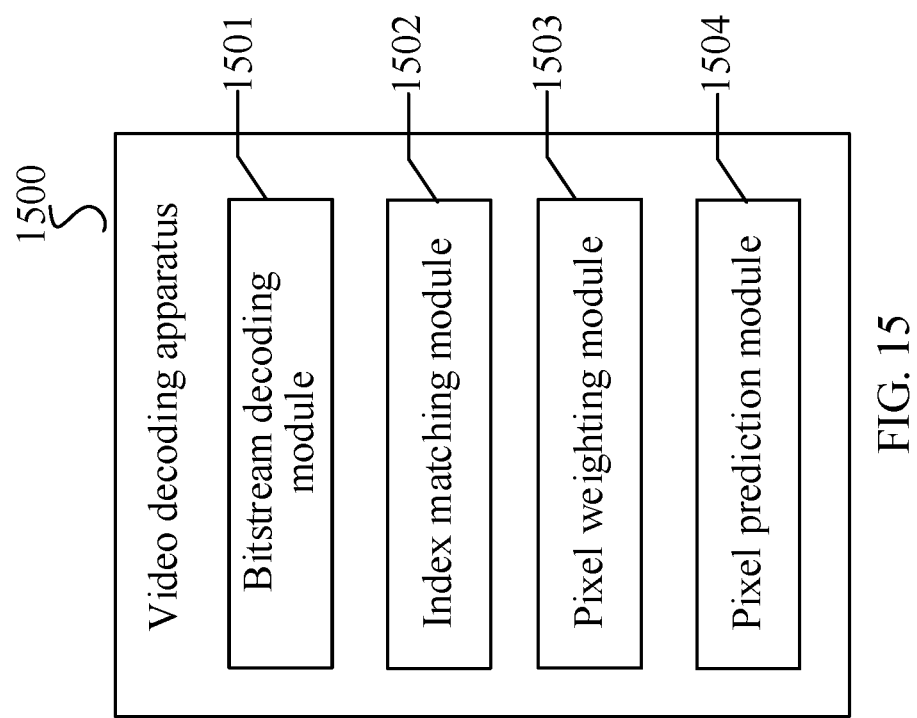
FIG. 15 schematically shows a block diagram of a video decoding apparatus according to an embodiment of the present disclosure.

FIG. 15 schematically shows a block diagram of a video decoding apparatus according to an embodiment of the present disclosure.

Referring to FIG. 15, a video decoding apparatus 1500 according to an embodiment of the present disclosure includes: a bitstream decoding module 1501, an index matching module 1502, a pixel weighting module 1503, and a pixel prediction module 1504.

The bitstream decoding module 1501 is configured to decode a bitstream to obtain a first flag, a first index value, and a second index value, the first flag being used for identifying whether to use an intra weighted prediction mode for a current block. The index matching module 1502 is configured to determine a target intra prediction mode in a first intra prediction mode list according to the first index value and determine a target weighting list in a weighting list set according to the second index value, in response to a value of the first flag satisfying a first preset condition. The pixel weighting module 1503 is configured to determine reference samples of a first category and reference samples of a second category according to reference samples corresponding to the current block, and weight the reference samples of the first category and the reference samples of the second category based on the target weighting list to obtain weighted reference samples. The pixel prediction module 1504 is configured to predict the current block according to the weighted reference samples and the target intra prediction mode to obtain a predicted block corresponding to the current block.

In some embodiments, the first intra prediction mode list includes a plurality of intra prediction modes and serial numbers corresponding to each of the intra prediction modes; and the index matching module 1502 is configured to: match the first index value against the serial numbers in the first intra prediction mode list to obtain a target serial number matching the first index value; and determine the intra prediction mode corresponding to the target serial number as the target intra prediction mode.

In some embodiments, the video decoding apparatus 1500 is further configured to: obtain a second flag; determine the target intra prediction mode in the first intra prediction mode list according to the first index value in response to determining according to the second flag that the target intra prediction mode is in the first intra prediction mode list; and decode the bitstream to obtain a third index value and determine the target intra prediction mode in a second intra prediction mode list according to the third index value, in response to determining according to the second flag that the target intra prediction mode is not in the first intra prediction mode list, the intra prediction modes included in the first intra prediction mode list being different from those included in the second intra prediction mode list.

In some embodiments, the first intra prediction mode list includes one or more of an intra prediction mode, a preset angular mode, a bilinear mode, or a plane mode corresponding to a decoded block adjacent or non-adjacent to the current block, and intra prediction modes included in the first intra prediction mode list are different from each other.

In some embodiments, the weighting list set includes a plurality of weighting lists and serial numbers corresponding to the weighting lists, the serial numbers corresponding to the weighting lists are generated based on index values, intra prediction modes, and a width and a height of the block to be decoded, and the index values being of a same type as a type of the second index value; and the index matching module 1502 is further configured to: determine an identifier according to the second index value, the width and the height of the current block, and the target intra prediction mode; and match the identifier against serial numbers in the weighting list set to obtain a target serial number, and determine the weighting list corresponding to the target serial number as the target weighting list.

In some embodiments, the video decoding apparatus 1500 further includes: a weighting list construction module, configured to determine a weighting list corresponding to the block to be decoded according to an intra prediction mode corresponding to the block to be decoded and the width and the height of the block to be decoded.

In some embodiments, the weighting list construction module includes: a first length determining unit, configured to determine a length of the reference samples corresponding to the block to be decoded according to the width and the height of the block to be decoded; a second length determining unit, configured to determine valid reference samples and a valid reference sample length in a length direction of the reference samples according to the intra prediction mode corresponding to the block to be decoded; a position determining unit, configured to set one or more preset points in the valid reference samples based on the valid reference sample length, determine a first position in the valid reference samples according to the index values and the preset points, and determine second position according to a position of a preset reference sample; and a weight setting unit, configured to set weights of the reference samples according to a relationship between the first position and the second position to obtain a weighting list corresponding to the block to be decoded.

In some embodiments, the second length determining unit is configured to: obtain a predicted angle and determining the valid reference samples and the valid reference sample length according to the width and the height of the block to be decoded and the predicted angle, in response to the intra prediction mode being an angular mode; and determine the valid reference samples as the reference samples and determine the valid reference sample length as the length of the reference samples, in response to the intra prediction mode being a non-angular mode.

In some embodiments, the weight setting unit is configured to: set weights of the preset reference sample and the reference sample whose position coordinates are less than the coordinates of the first position as first weights and set weights of the remaining reference samples as second weights, in response to coordinates of the first position being less than coordinates of the second position; and set the weights of the preset reference sample and the reference sample whose position coordinates are less than the coordinates of the first position as the second weights and set the weights of the remaining reference samples as the first weights, in response to the coordinates of the first position being greater than or equal to the coordinates of the second position.

In some embodiments, the weight setting unit is configured to: add a transition weight at the first position, wherein a transition weight of a reference sample located before the first position is any weight in a weight value range, a transition weight of a reference sample located after the first position varies with a distance between a position of the reference sample and the first position, and the transition weight of the reference sample after the first position is greater than a weight of the reference sample before the first position and less than or equal to a maximum weight in the weight value range; or add a transition weight at the first position, wherein a transition weight of a reference sample located before the first position varies with an absolute distance between a position of the reference sample and the first position, a transition weight of a reference sample located after the first position is any weight in the weight value range, and the transition weight of the reference sample before the first position is greater than a weight of the reference sample after the first position and less than or equal to the maximum weight in the weight value range.

In some embodiments, the pixel weighting module 1503 includes: a pixel processing unit, configured to build auxiliary reference samples of a same size according to the reference samples, and perform target processing on pixel values of the reference samples to obtain pixel values of pixels among the auxiliary reference samples; and a classification unit, configured to classify the reference samples and the auxiliary reference samples according to a preset rule to obtain the reference samples of the first category and the reference samples of the second category.

In some embodiments, the classification unit is configured to: determine the reference samples as the reference samples of the first category and determine the auxiliary reference samples as the reference samples of the second category; or decode the bitstream to obtain a third flag; determine the reference samples as the reference samples of the first category and determine the auxiliary reference samples as the reference samples of the second category, in response to a value of the third flag satisfying a second preset condition; and determine the auxiliary reference samples as the reference samples of the first category and determine the reference samples as the reference samples of the second category, in response to the value of the third flag not satisfying the second preset condition.

In some embodiments, the pixel weighting module 1503 is configured to: determining the weighted reference samples according to a calculation formula (3):

$$R[x][y]=(R_0[x][y]\times R_W[x][y]+R_1[x][y]\times(\max\_w - R_W[x][y]))/\max\_w \quad (3),$$

wherein R[x][y] represents a weighted reference sample at coordinates (x, y), $R_0$[x][y] represents a reference sample of the first category at the coordinates (x, y), $R_W$[x][y] represents a weight corresponding to the reference sample at the coordinates (x, y) in the target weighting list, $R_1$[x][y] represents a reference sample of the second category at the coordinates (x, y), and max_w represents a maximum value in the weight value range.

In some embodiments, the reference samples include luminance reference samples and chrominance reference samples, and the weighted reference samples include weighted luminance reference samples and weighted chrominance reference samples.

In some embodiments, the reference samples are luminance reference samples, and the weighted reference samples are weighted luminance reference samples; and the video decoding apparatus 1500 is further configured to: process weights of the luminance reference samples according to a calculation formula (4) to obtain a weighting list of chrominance reference samples: determine chrominance reference samples of a first category and chrominance reference samples of a second category according to chrominance reference samples corresponding to the current block, and weight the chrominance reference samples of the first category and the chrominance reference samples of the second category based on the weighting list of the chrominance reference samples to obtain weighted chrominance reference samples.

The calculation formula (4) is as follows:

$$R_W\_\text{Chorma}[x][y] = R_W\_\text{Luma}[x<<\text{scale}\_x][y<<\text{scale}\_y] \quad (4),$$

wherein, $R_W\_\text{Chorma}[x][y]$ represents a weight of a chrominance reference sample at coordinates (x, y), $R_W\_\text{Luma}$ represents a weighting list corresponding to the luminance reference samples, and scale_x represents a size scaling factor of a luminance component and a chrominance component of a video image in an x direction, scale_y represents a size scaling factor of the luminance component and the chrominance component of the video image in a y direction, and << represents a left shift operator.

In some embodiments, the pixel prediction module 1504 is configured to: predict the current block according to the weighted luminance reference samples, the weighted chrominance reference samples, and the target intra prediction mode.

In some embodiments, the video decoding apparatus 1500 is further configured to: before obtaining the first flag, obtain the width and the height of the current block, and decode the bitstream to obtain the first flag in response to the width and the height of the current block satisfying a third preset condition; or before obtaining the first flag, decode the bitstream to obtain an image header flag, and decode the bitstream to obtain the first flag in response to the image header flag satisfying a fourth preset condition; or before obtaining the first flag, decode the bitstream to obtain a sequence header flag, and decode the bitstream to obtain the first flag or the image header flag and the first flag in response to the sequence header flag satisfying a fifth preset condition.

In some embodiments, the video decoding apparatus 1500 further includes: a first storage module, configured to store an intra weighted prediction mode corresponding to the current block as a final intra prediction mode; or a decomposition module, configured to decompose the current block into a plurality of sub-decoding blocks according to a preset value; an index value determining module, configured to determine a storage mode index value according to a preset pixel in each of the sub-decoding blocks, the target intra prediction mode, and the target weighting list; and a second storage module, configured to determine an intra prediction mode corresponding to the sub-decoding block according to the storage mode index value, and store the sub-decoding block and the intra prediction mode corresponding to the sub-decoding block in a correspondence.

In some embodiments, the index value determining module is configured to: in response to the target intra prediction mode being an angular mode, project the preset pixel in a direction of the valid reference samples according to a predicted angle in the angular mode to obtain a target reference sample; obtain a weight corresponding to the target reference sample in the target weighting list; mark the storage mode index value as a first value in response to the weight corresponding to the target reference sample being greater than or equal to a first preset threshold; and mark the storage mode index value as a second value different from the first value, in response to the weight corresponding to the target reference sample being less than the first preset threshold; or in response to the target intra prediction mode being a non-angular mode, classify reference samples corresponding to the sub-decoding blocks according to the target weighting list and a second preset threshold to obtain a first number of reference samples whose weights are less than the second preset threshold and a second number of reference samples whose weights are greater than or equal to the second preset threshold among the reference samples corresponding to the sub-decoding blocks; mark the storage mode index value as the first value in response to the first number being less than or equal to the second number; and mark the storage mode index value as the second value in response to the first number being greater than the second number.

In some embodiments, the second storage module is configured to: determine that the intra prediction mode corresponding to the sub-decoding block is an intra prediction mode corresponding to the reference samples of the first category in response to the storage mode index value being the first value; and determine that the intra prediction mode corresponding to the sub-decoding block is an intra prediction mode corresponding to the reference samples of the second category in response to the storage mode index value being the second value.

Figure 16:
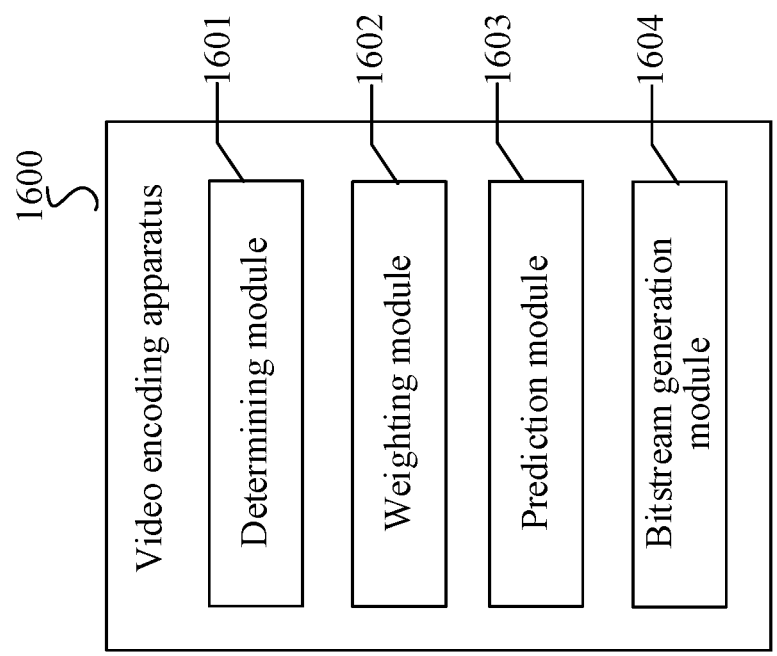
FIG. 16 schematically shows a block diagram of a video encoding apparatus according to an embodiment of the present disclosure.

FIG. 16 schematically shows a block diagram of a video encoding apparatus according to an embodiment of the present disclosure.

Referring to FIG. 16, a video encoding apparatus 1600 according to an embodiment of the present disclosure includes: a determining module 1601, a weighting module 1602, a prediction module 1603, and a bitstream generation module 1604.

The determining module 1601 is configured to determine a target intra prediction mode corresponding to a current block, and determine a target weighting list corresponding to the current block in a weighting list set. The weighting module 1602 is configured to determine reference samples of a first category and reference samples of a second category according to reference samples corresponding to the current block, and weight the reference samples of the first category and the reference samples of the second category based on the target weighting list to obtain weighted reference samples. The prediction module 1603 is configured to predict the current block according to the weighted reference samples and the target intra prediction mode to obtain a predicted block corresponding to the current block. The bitstream generation module 1604 is configured to form a bitstream according to the predicted block, and add a first flag, a first index value, and a second index value to the bitstream, the first flag being used for identifying whether to use an intra weighted prediction mode for a block to be decoded, the first index value being used for determining a target intra prediction mode corresponding to the block to be decoded in a first intra prediction mode list, and the second index value being used for determining a target weighting list corresponding to the block to be decoded in the weighting list set.

In some embodiments, the video encoding apparatus 1600 is configured to: determine the target intra prediction mode in an intra prediction mode list, where the intra prediction mode list includes one or more of an intra prediction mode, a preset angular mode, a bilinear mode, or a plane mode corresponding to an encoded block adjacent or non-adjacent to the current block, and intra prediction modes included in the intra prediction mode list are different from each other.

In some embodiments, the weighting list set includes a plurality of weighting lists and serial numbers corresponding to the weighting lists, and the serial numbers corresponding to the weighting lists are generated based on index values, intra prediction modes, and a width and a height of the block to be decoded; and the determining module 1601 is configured to: determine an identifier according to a preset index value, the width and the height of the current block, and the target intra prediction mode; and match the identifier against serial numbers in the weighting list set to obtain a target serial number, and determine the weighting list corresponding to the target serial number as the target weighting list.

In some embodiments, the video encoding apparatus 1600 further includes: a weighting list construction module, configured to determine a weighting list corresponding to the block to be encoded according to an intra prediction mode corresponding to the block to be encoded and the width and the height of the block to be encoded.

In some embodiments, the weighting list construction module includes: a first length determining unit, configured to determine a length of the reference samples corresponding to the block to be encoded according to the width and the height of the block to be encoded; a second length determining unit, configured to determine valid reference samples and a valid reference sample length in a length direction of the reference samples according to the intra prediction mode corresponding to the block to be encoded; a position determining unit, configured to set one or more preset points in the valid reference samples based on the valid reference sample length, determine a first position in the valid reference samples according to the index values and the preset points, and determine second position according to a position of a preset reference sample; and a weight setting unit, configured to set weights of the reference samples according to a relationship between the first position and the second position to obtain a weighting list corresponding to the block to be encoded.

In some embodiments, the second length determining unit is configured to: obtain a predicted angle and determine the valid reference samples and the valid reference sample length according to the width and the height of the block to be encoded and the predicted angle, in response to the intra prediction mode being an angular mode; and determine the valid reference samples as the reference samples and determine the valid reference sample length as the length of the reference samples, in response to the intra prediction mode being not the angular mode.

In some embodiments, the weight setting unit is configured to: set weights of the preset reference sample and the reference sample whose position coordinates are less than the coordinates of the first position as first weights and set weights of the remaining reference samples as second weights, in response to coordinates of the first position being less than coordinates of the second position; and set the weights of the preset reference sample and the reference sample whose position coordinates are less than the coordinates of the first position as the second weights and set the weights of the remaining reference samples as the first weights, in response to the coordinates of the first position being greater than or equal to the coordinates of the second position.

In some embodiments, the weight setting unit is configured to: add a transition weight at the first position, wherein a transition weight of a reference sample located before the first position is any weight in a weight value range, a transition weight of a reference sample located after the first position varies with a distance between a position of the reference sample and the first position, and the transition weight of the reference sample after the first position is greater than a weight of the reference sample before the first position and less than or equal to a maximum weight in the weight value range; or add a transition weight at the first position, wherein a transition weight of a reference sample located before the first position varies with an absolute distance between a position of the reference sample and the first position, a transition weight of a reference sample located after the first position is any weight in the weight value range, and the transition weight of the reference sample before the first position is greater than a weight of the reference sample after the first position and less than or equal to the maximum weight in the weight value range.

In some embodiments, the weighting module 1602 includes: a pixel processing unit, configured to build auxiliary reference samples of a same size according to the reference samples, and perform target processing on pixel values of the reference samples to obtain pixel values of pixels among the auxiliary reference samples; and a classification unit, configured to classify the reference samples and the auxiliary reference samples according to a preset rule to obtain the reference samples of the first category and the reference samples of the second category.

In some embodiments, the classification unit is configured to: determine the reference samples as the reference samples of the first category and determine the auxiliary reference samples as the reference samples of the second category; or encode the bitstream to obtain a third flag; determine the reference samples as the reference samples of the first category and determine the auxiliary reference samples as the reference samples of the second category, in response to a value of the third flag satisfying a second preset condition; and determine the auxiliary reference samples as the reference samples of the first category and determine the reference samples as the reference samples of the second category, in response to the value of the third flag not satisfying the second preset condition.

In some embodiments, the weighting module 1602 is configured to: determining the weighted reference samples according to a calculation formula (3):

$$R[x][y]=(R_0[x][y]\times R_W[x][y]+R_1[x][y]\times(\text{max\_}w-R_W[x][y]))/\text{max\_}w \quad (3),$$

wherein R[x][y] represents a weighted reference sample at coordinates (x, y), $R_0$[x][y] represents a reference sample of the first category at the coordinates (x, y), $R_W$[x][y] represents a weight corresponding to the reference sample at the coordinates (x, y) in the target weighting list, $R_1$[x][y] represents a reference sample of the second category at the coordinates (x, y), and max_w represents a maximum value in the weight value range.

In some embodiments, the reference samples include luminance reference samples and chrominance reference samples, and the weighted reference samples include weighted luminance reference samples and weighted chrominance reference samples.

In some embodiments, the reference samples are luminance reference samples, and the weighted reference samples are weighted luminance reference samples; and the video encoding apparatus 1600 is further configured to: process weights of the luminance reference samples according to a calculation formula (4) to obtain a weighting list of chrominance reference samples: determine chrominance reference samples of a first category and chrominance reference samples of a second category according to chrominance reference samples corresponding to the current block, and weight the chrominance reference samples of the first category and the chrominance reference samples of the second category based on the weighting list of the chrominance reference samples to obtain weighted chrominance reference samples.

The calculation formula (4) is as follows:

$$R_W\_\text{Chorma}[x][y]=R_W\_\text{Luma}[x<<\text{scale\_}x][y<<\text{scale\_}y] \quad (4),$$

wherein, $R_W\_\text{Chorma}[x][y]$ represents a weight of a chrominance reference sample at coordinates (x, y), $R_W\_\text{Luma}$ represents a weighting list corresponding to the luminance reference samples, and scale_x represents a size scaling factor of a luminance component and a chrominance component of a video image in an x direction, scale_y represents a size scaling factor of the luminance component and the chrominance component of the video image in a y direction, and << represents a left shift operator.

In some embodiments, the prediction module 1603 is configured to: predict the current block according to the weighted luminance reference samples, the weighted chrominance reference samples, and the target intra prediction mode.

In some embodiments, the video encoding apparatus 1600 further includes: a first storage module, configured to store an intra weighted prediction mode corresponding to the current block as a final intra prediction mode; or a decomposition module, configured to decompose the current block into a plurality of sub-coding blocks according to a preset value; an index value determining module, configured to determine a storage mode index value according to a preset pixel in each of the sub-coding blocks, the target intra prediction mode, and the target weighting list; and a second storage module, configured to determine an intra prediction mode corresponding to the sub-coding block according to the storage mode index value, and store the sub-coding block and the intra prediction mode corresponding to the sub-coding block in a correspondence.

In some embodiments, the index value determining module is configured to: in response to the target intra prediction mode being an angular mode, project the preset pixel in a direction of the valid reference samples according to a predicted angle in the angular mode to obtain a target reference sample; obtain a weight corresponding to the target reference sample in the target weighting list; mark the storage mode index value as a first value in response to the weight corresponding to the target reference sample being greater than or equal to a first preset threshold; and mark the storage mode index value as a second value different from the first value, in response to the weight corresponding to the target reference sample being less than the first preset threshold; or in response to the target intra prediction mode being a non-angular mode, classify reference samples corresponding to the sub-coding blocks according to the target weighting list and a second preset threshold to obtain a first number of reference samples whose weights are less than the second preset threshold and a second number of reference samples whose weights are greater than or equal to the second preset threshold among the reference samples corresponding to the sub-coding blocks; mark the storage mode index value as the first value in response to the first number being less than or equal to the second number; and mark the storage mode index value as the second value in response to the first number being greater than the second number.

In some embodiments, the second storage module is configured to: determine that the intra prediction mode corresponding to the sub-coding block is an intra prediction mode corresponding to the reference samples of the first category in response to the storage mode index value being the first value; and determine that the intra prediction mode corresponding to the sub-coding block is an intra prediction mode corresponding to the reference samples of the second category in response to the storage mode index value being the second value.

Figure 17:
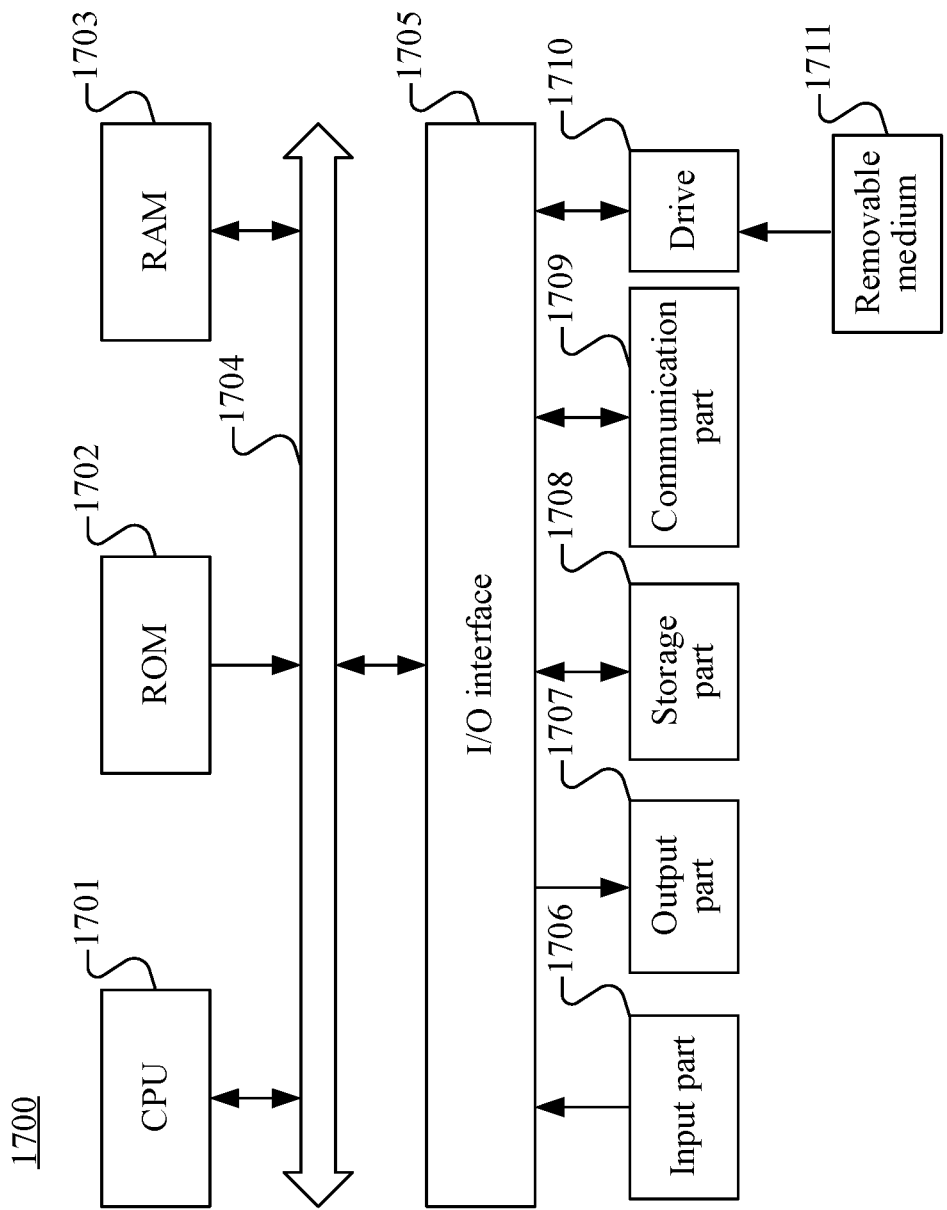
FIG. 17 is a schematic structural diagram of a computer system adapted to implement an electronic device according to an embodiment of this application.

FIG. 17 is a schematic structural diagram of a computer system adapted to implement an electronic device according to an embodiment of this application.

It should be noted that, the computer system 1700 of the electronic device shown in FIG. 17 is merely an example, and does not constitute any limitation on functions and use ranges of the embodiments of this application.

As shown in FIG. 17, the computer system 1700 includes a central processing unit (CPU) 1701, which may perform various suitable actions and processing based on a program stored in a read-only memory (ROM) 1702 or a program loaded from a storage part 1708 into a random access memory (RAM) 1703, to implement the video encoding method and the video decoding method described in the foregoing embodiments. The RAM 1703 further stores various programs and data required for operating the system. The CPU 1701, the ROM 1702, and the RAM 1703 are connected to each other through a bus 1704. An input/output (I/O) interface 1705 is also connected to the bus 1704.

The following components are connected to the I/O interface 1705: an input part 1706 including a keyboard and a mouse, etc.; an output part 1707 including a cathode ray tube (CRT), a liquid crystal display (LCD), a speaker, or the like; a storage part 1708 including hard disk, etc.; and a communication part 1709 including a network interface card such as a local area network (LAN) card, a modem, or the like. The communication part 1709 performs communication processing by using a network such as the Internet. A drive 1710 is also connected to the I/O interface 1705 as required. A removable medium 1711, such as a disk, an optical disc, a magneto-optical disc, or a semiconductor memory, is installed on the drive 1710 as required, so that a computer program read from the removable medium 1311 is installed in the storage part 1708 as required.

Particularly, according to an embodiment of the present disclosure, the processes described below by referring to the flowcharts may be implemented as computer software programs. For example, an embodiment of the present disclosure includes a computer program product, including a computer program carried on a computer-readable medium. The computer program includes program code for performing the method shown in the flowchart. In such an embodiment, the computer program may be downloaded and installed through the communication part 1709 from a network, and/or installed from the removable medium 1711. When the computer program is executed by the CPU 1701, the various functions defined in the system of the present disclosure are executed.

It should be noted that, the computer-readable storage medium shown in the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. More specific examples of the computer readable storage medium may include, but are not limited to: An electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal being in a baseband or propagated as at least a part of a carrier wave, and carries computer-readable program code. A data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The program code included in the computer-readable storage medium may be transmitted using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of this application. In this regard, each box in the flowchart or the block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of this application may be implemented in a software manner, or may be implemented in a hardware manner, and the unit described can also be set in a processor. Names of these units do not constitute a limitation on the units in a case.

In another aspect, this application further provides a computer-readable storage medium. The computer-readable storage medium may be included in the electronic device described in the above embodiments, or may exist alone without being assembled into the electronic device. The computer-readable storage medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of this application, the features and functions of two or more modules or units described above may be specified in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to the embodiments of this application.

Other embodiments of this application will be apparent to a person skilled in the art from consideration of the specification and practice of the disclosure here. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure.

It should be understood that the present application is not limited to the precise structures described above and shown in the accompanying drawings, and various modifications and changes can be made without departing from the scope of the present application. The scope of the present application is subject only to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A video decoding method performed at an electronic device, comprising:
    obtaining a video bitstream that includes a plurality of blocks, the plurality of blocks including a current block;
    obtaining a width and a height of the current block;
    when the width and the height of the current block satisfy a first preset condition, decoding the video bitstream to obtain a first flag, the first flag being used for identifying whether to use an intra weighted prediction mode for the current block;
    determining, according to the first flag having a first value, that the intra weighted prediction mode is to be applied to predict the current block;
    when it is determined that the intra weighted prediction mode is to be applied to predict the current block:
        decoding the video bitstream to obtain a first index value, and determining a target intra prediction mode in a first intra prediction mode list according to the first index value;
        decoding the video bitstream to obtain a second index value, and determining a target weighting list in from a set of weighting lists according to the second index value;
        determining reference samples of a first category and reference samples of a second category according to reference samples corresponding to the current block;
        weighting the reference samples of the first category and the reference samples of the second category based on the target weighting list to obtain weighted reference samples; and
        predicting samples in the current block according to the weighted reference samples and the target intra prediction mode to obtain predicted samples of the current block.

2. The method according to claim 1, wherein the first intra prediction mode list comprises a plurality of intra prediction modes and serial numbers corresponding to each of the intra prediction modes; and
    determining the target intra prediction mode in the first intra prediction mode list according to the first index value comprises:
        matching the first index value against the serial numbers in the first intra prediction mode list to obtain a target serial number matching the first index value; and
        determining the intra prediction mode corresponding to the target serial number as the target intra prediction mode.

3. The method according to claim 1, wherein the method further comprises:
    obtaining a second flag;
    determining the target intra prediction mode in the first intra prediction mode list according to the first index value in response to determining according to the second flag that the target intra prediction mode is in the first intra prediction mode list; and
    decoding the video bitstream to obtain a third index value and determining the target intra prediction mode in a second intra prediction mode list according to the third index value, in response to determining according to the second flag that the target intra prediction mode is not in the first intra prediction mode list, the intra prediction modes comprised in the first intra prediction mode list being different from those comprised in the second intra prediction mode list.

4. The method according to claim 1, wherein the first intra prediction mode list comprises one or more of an intra prediction mode, a preset angular mode, a bilinear mode, or a plane mode corresponding to a decoded block, the decoded block is adjacent or non-adjacent to the current block to be decoded, and the intra prediction modes comprised in the first intra prediction mode list are different from each other.

5. The method according to claim 1, wherein the set of weighting lists comprises a plurality of weighting lists and serial numbers corresponding to the weighting lists, the serial numbers corresponding to the weighting lists are generated based on index values, intra prediction modes, and the width and the height of the current block, and the index values are the same type as a type of the second index value; and determining the target weighting list in the set of weighting lists according to the second index value comprises:
determining an identifier according to the second index value, the width and the height of the current block, and the target intra prediction mode; and
mapping the identifier to each of the serial numbers in the weighting list set to obtain a target serial number, and determining the weighting list corresponding to the target serial number as the target weighting list.

6. The method according to claim 5, wherein the method further comprises: determining a weight list corresponding to the current block according to an intra prediction mode corresponding to the current block and the width and the height of the current block.

7. The method according to claim 1, wherein the method further comprises:
determining a length of the reference samples corresponding to the current block according to the width and the height of the current block;
determining valid reference samples and a valid reference sample length in a length direction of the reference samples according to the intra prediction mode corresponding to the current block;
setting one or more preset points in the valid reference samples based on the valid reference sample length, determining a first position in the valid reference samples according to the index values and the preset points, and determining second position according to a position of a preset reference sample; and
setting weights of the reference samples according to a relationship between the first position and the second position to obtain a weighting list corresponding to the current block.

8. The method according to claim 7, wherein the determining valid reference samples and a valid reference sample length in a length direction of the reference samples according to the intra prediction mode corresponding to the current block comprises:
obtaining a predicted angle and determining the valid reference samples and the valid reference sample length according to the width and the height of the current block and the predicted angle, in response to the intra prediction mode being an angular mode; and
determining the valid reference samples as the reference samples and determining the valid reference sample length as the length of the reference samples, in response to the intra prediction mode being a non-angular mode.

9. The method according to claim 7, wherein the setting weights of the reference samples according to a relationship between the first position and the second position comprises:
setting weights of the preset reference sample and the reference sample whose position coordinates are less than coordinates of the first position as first weights and setting weights of the remaining reference samples as second weights, in response to the coordinates of the first position being less than coordinates of the second position; and
setting the weights of the preset reference sample and the reference sample whose position coordinates are less than the coordinates of the first position as the second weights and setting the weights of the remaining reference samples as the first weights, in response to the coordinates of the first position being greater than or equal to the coordinates of the second position.

10. The method according to claim 7, wherein the setting weights of the reference samples according to a relationship between the first position and the second position comprises:
adding a transition weight at the first position, wherein a transition weight of a reference sample located before the first position is any weight in a weight value range, a transition weight of a reference sample located after the first position varies with a distance between a position of the reference sample and the first position, and the transition weight of the reference sample after the first position is greater than a weight of the reference sample before the first position and less than or equal to a maximum weight in the weight value range; or
adding a transition weight at the first position, wherein a transition weight of a reference sample located before the first position varies with an absolute distance between a position of the reference sample and the first position, a transition weight of a reference sample located after the first position is any weight in the weight value range, and the transition weight of the reference sample before the first position is greater than a weight of the reference sample after the first position and less than or equal to the maximum weight in the weight value range.

11. The method according to claim 1, wherein the determining reference samples of a first category and reference samples of a second category according to reference samples corresponding to the current block comprises:
determining auxiliary reference samples of a same size according to the reference samples, and performing target processing on pixel values of the reference samples to obtain pixel values of pixels among the auxiliary reference samples; and
classifying the reference samples and the auxiliary reference samples according to a preset rule to obtain the reference samples of the first category and the reference samples of the second category.

12. The method according to claim 11, wherein the classifying the reference samples and the auxiliary reference samples according to a preset rule to obtain the reference samples of the first category and the reference samples of the second category comprises:
determining the reference samples as the reference samples of the first category and determining the auxiliary reference samples as the reference samples of the second category; or decoding the video bitstream to obtain a third flag;

determining the reference samples as the reference samples of the first category and determining the auxiliary reference samples as the reference samples of the second category, in response to a value of the third flag satisfying a second preset condition; and determining the auxiliary reference samples as the reference samples of the first category and determining the reference samples as the reference samples of the second category, in response to the value of the third flag not satisfying the second preset condition.

13. The method according to claim 1, wherein the reference samples comprise luminance reference samples and chrominance reference samples, and the weighted reference samples comprise weighted luminance reference samples and weighted chrominance reference samples.

14. The method according to claim 1, further comprising before the obtaining a first flag:

decoding the video bitstream to obtain an image header flag, and decoding the video bitstream to obtain the first flag in response to the image header flag satisfying a fourth preset condition; or decoding the video bitstream to obtain a sequence header flag, and decoding the bitstream to obtain the first flag or the image header flag and the first flag in response to the sequence header flag satisfying a fifth preset condition.

15. The method according to claim 1, wherein the method further comprises:

storing an intra weighted prediction mode corresponding to the current block as a final intra prediction mode; or decomposing the current block into a plurality of sub-decoding blocks according to a preset value;

determining a storage mode index value according to a preset pixel in each of the sub-decoding blocks, the target intra prediction mode, and the target weighting list; and determining an intra prediction mode corresponding to the sub-decoding block according to the storage mode index value, and storing the sub-decoding block and the intra prediction mode corresponding to the sub-decoding block in a correspondence.

16. The method according to claim 15, wherein the determining a storage mode index value according to a preset pixel in each of the sub-decoding blocks, the target intra prediction mode, and the target weighting list comprises:

in response to the target intra prediction mode being an angular mode, projecting the preset pixel in a direction of valid reference samples according to a predicted angle in the angular mode to obtain a target reference sample;

obtaining a weight corresponding to the target reference sample in the target weighting list;

marking the storage mode index value as a first value in response to the weight corresponding to the target reference sample being greater than or equal to a first preset threshold; and marking the storage mode index value as a second value different from the first value, in response to the weight corresponding to the target reference sample being less than the first preset threshold.

17. The method according to claim 15, wherein the determining a storage mode index value according to a preset pixel in each of the plurality of sub-decoding blocks, the target intra prediction mode, and the target weighting list comprises:

in response to the target intra prediction mode being a non-angular mode, classifying reference samples corresponding to the sub-decoding blocks according to the target weighting list and a second preset threshold to obtain a first number of reference samples whose weights are less than the second preset threshold and a second number of reference samples whose weights are greater than or equal to the second preset threshold among the reference samples corresponding to the sub-decoding blocks;

marking the storage mode index value as the first value in response to the first number being less than or equal to the second number; and marking the storage mode index value as the second value in response to the first number being greater than the second number.

18. The method according to claim 15, wherein the determining an intra prediction mode corresponding to the sub-decoding block according to the storage mode index value comprises:

determining that the intra prediction mode corresponding to the sub-decoding block is an intra prediction mode corresponding to the reference samples of the first category in response to the storage mode index value being the first value; and determining that the intra prediction mode corresponding to the sub-decoding block is an intra prediction mode corresponding to the reference samples of the second category in response to the storage mode index value being the second value.

19. An apparatus for video decoding, comprising:

one or more processors; and a storage apparatus, configured to store one or more programs, the one or more programs, when executed by the one or more processors, cause the apparatus to implement a video decoding method including:

obtaining a video bitstream that includes a plurality of blocks, the plurality of blocks including a current block;

obtaining a width and a height of the current block;

when the width and the height of the current block satisfy a first preset condition, decoding the video bitstream to obtain a first flag, the first flag being used for identifying whether to use an intra weighted prediction mode for the current block;

when it is determined that the intra weighted prediction mode is to be applied to predict the current block:

decoding the video bitstream to obtain a first index value, and determining a target intra prediction mode in a first intra prediction mode list according to the first index value;

decoding the video bitstream to obtain a second index value, and determining a target weighting list in from a set of weighting lists according to the second index value;

determining reference samples of a first category and reference samples of a second category according to reference samples corresponding to the current block;

weighting the reference samples of the first category and the reference samples of the second category based on the target weighting list to obtain weighted reference samples; and predicting samples in the current block according to the weighted reference samples and the target intra prediction mode to obtain predicted samples of the current block.

20. A non-transitory computer readable storage medium, storing executable instructions, the executable instructions, when executed by a processor of an electronic device, causing the electronic device to implement a video decoding method including:
- obtaining a video bitstream that includes a plurality of blocks, the plurality of blocks including a current block;
- obtaining a width and a height of the current block;
- when the width and the height of the current block satisfy a first preset condition, decoding the video bitstream to obtain a first flag, the first flag being used for identifying whether to use an intra weighted prediction mode for the current block;
- determining, according to the first flag having a first value, that the intra weighted prediction mode is to be applied to predict the current block;
- when it is determined that the intra weighted prediction mode is to be applied to predict the current block:
  - decoding the video bitstream to obtain a first index value, and determining a target intra prediction mode in a first intra prediction mode list according to the first index value;
  - decoding the video bitstream to obtain a second index value, and determining a target weighting list in from a set of weighting lists according to the second index value;
  - determining reference samples of a first category and reference samples of a second category according to reference samples corresponding to the current block;
  - weighting the reference samples of the first category and the reference samples of the second category based on the target weighting list to obtain weighted reference samples; and
  - predicting samples in the current block according to the weighted reference samples and the target intra prediction mode to obtain predicted samples of the current block.

* * * * *